United States Patent
Yokoyama et al.

(10) Patent No.: US 11,969,823 B2
(45) Date of Patent: Apr. 30, 2024

(54) LASER PROCESSING APPARATUS AND LASER PROCESSING METHOD

(71) Applicant: Panasonic Intellectual Property Management Co., Ltd., Osaka (JP)

(72) Inventors: Jun Yokoyama, Osaka (JP); Yohei Takechi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 413 days.

(21) Appl. No.: 17/214,708

(22) Filed: Mar. 26, 2021

(65) Prior Publication Data

US 2021/0323088 A1    Oct. 21, 2021

(30) Foreign Application Priority Data

Apr. 16, 2020  (JP) ................. 2020-073509
Feb. 2, 2021   (JP) ................. 2021-015203

(51) Int. Cl.
*B23K 26/082* (2014.01)
*B23K 26/03*  (2006.01)
*B23K 26/064* (2014.01)

(52) U.S. Cl.
CPC .......... *B23K 26/082* (2015.10); *B23K 26/032* (2013.01); *B23K 26/064* (2015.10)

(58) Field of Classification Search
CPC ........ B23K 1/0016; B23K 1/008; B23K 1/20; B23K 1/005; B23K 1/19; B23K 1/203;

(Continued)

(56) References Cited

U.S. PATENT DOCUMENTS

| 5,097,291 A   | 3/1992 | Suzuki |
| 8,735,768 B2* | 5/2014 | Urashima ............. B23K 26/26  219/121.75 |

(Continued)

FOREIGN PATENT DOCUMENTS

| JP | 2004-074166 A | 3/2004 |
| JP | 2008-030109 A | 2/2008 |

(Continued)

OTHER PUBLICATIONS

Non-Final Office Action dated Apr. 27, 2023 issued in U.S. Appl. No. 16/995,153.

Primary Examiner — Brian W Jennison
Assistant Examiner — Kristina J Babinski
(74) Attorney, Agent, or Firm — Rimon P.C.

(57) ABSTRACT

A laser processing apparatus sets a processing section passing through a target position on a processing surface, sets a measurement section centered on the target position in the processing section, sets a plurality of data acquisition positions that are trajectories perpendicular to a processing direction in the measurement section. The laser processing apparatus acquires pieces of measurement data indicating shapes of keyholes at the respective data acquisition positions during processing of the processing section, and projects the pieces of measurement data in the processing direction to be superimposed on each other to create projection data. The laser processing apparatus obtains the second instruction value in a direction perpendicular to the processing direction at the target position on the basis of the projection data. Therefore, it is possible to provide a laser processing apparatus and a laser processing method capable of accurately measuring a depth of a keyhole.

5 Claims, 20 Drawing Sheets

(58) Field of Classification Search
CPC .... B23K 1/015; B23K 10/022; B23K 3/0638; B23K 3/08; B23K 3/087; B23K 3/00; B23K 3/0607; B23K 3/0623; B23K 3/085; B23K 9/073; B23K 9/09; B23K 9/173; B23K 9/124; B23K 9/092; B23K 9/095; B23K 9/0953; B23K 9/12; B23K 9/125; B23K 9/0732; B23K 9/0956; B23K 9/23; B23K 9/1012; B23K 9/1043; B23K 9/025; B23K 9/067; B23K 9/0738; B23K 9/1062; B23K 9/133; B23K 9/232; B23K 9/0735; B23K 9/093; B23K 9/10; B23K 26/21; B23K 26/244; B23K 26/0648; B23K 26/082; B23K 26/0643; B23K 26/0884; B23K 26/0626; B23K 26/064; B23K 26/032; B23K 26/08; B23K 26/38; B23K 26/0608; B23K 26/0622; B23K 26/22; B23K 26/364; B23K 26/0006; B23K 26/0613; B23K 26/24; B23K 26/323; B23K 26/402; B23K 26/0624; B23K 26/0876; B23K 26/32; B23K 26/322; B23K 26/354; B23K 26/707; B23K 26/00; B23K 26/043; B23K 26/06; B23K 26/066; B23K 26/0665; B23K 26/073; B23K 26/142; B23K 26/211; B23K 26/26; B23K 26/359; B23K 26/361; B23K 26/40; B23K 26/703; B23K 26/705; B23K 26/706; B23K 20/10; B23K 20/106; B23K 26/0093; B23K 26/02; B23K 26/035; B23K 26/042; B23K 26/062; B23K 26/067; B23K 26/0823; B23K 26/0853; B23K 26/10; B23K 26/1476; B23K 26/16; B23K 26/20; B23K 26/242; B23K 26/324; B23K 26/36; B23K 26/57; B23K 26/60; B23K 26/702; B23K 2101/42; B23K 2103/04; B23K 2101/40; B23K 2101/34; B23K 2103/56; B23K 2103/172; B23K 2103/18; B23K 2101/18; B23K 2101/36; B23K 2101/006; B23K 2103/08; B23K 2103/42; B23K 2101/35; B23K 2101/38; B23K 2103/166; B23K 2103/20; B23K 2103/22; B23K 2103/26; B23K 2103/50; B23K 2103/52; B23K 35/262; B23K 35/26; B23K 35/264; B23K 35/0244; B23K 35/3613; B23K 35/362; B23K 35/0222; B23K 35/24; B23K 35/3013; B23K 35/302; B23K 35/40; B23K 35/025; B23K 37/04; B23K 31/02; B23K 33/00; B23K 35/0261; B23K 35/3006; B23K 37/003; B23K 37/0408; B25B 21/02; B25B 23/1475; B25B 21/00; B25B 23/1405; B25B 21/026; B25B 23/147; B25B 23/14; B25B 23/141; B25B 11/002; B25B 11/005

See application file for complete search history.

(56) References Cited

U.S. PATENT DOCUMENTS

| | | | |
|---|---|---|---|
| 8,735,770 | B2 | 5/2014 | Kuno et al. |
| 8,822,875 | B2 | 9/2014 | Webster et al. |
| 9,457,428 | B2 | 10/2016 | Webster et al. |
| 9,492,889 | B2 * | 11/2016 | Suzuki ................ B23K 26/067 |
| 10,022,818 | B2 | 7/2018 | Webster et al. |
| 10,124,410 | B2 | 11/2018 | Kanko et al. |
| 2012/0138586 | A1 | 6/2012 | Webster et al. |
| 2014/0153085 | A1 | 6/2014 | Dobbie |
| 2017/0326669 | A1 | 11/2017 | Moser et al. |
| 2018/0290235 | A1 | 10/2018 | Webster et al. |
| 2021/0205920 | A1 | 7/2021 | Shiraishi et al. |
| 2021/0247366 | A1 | 8/2021 | Nishikino et al. |
| 2021/0276122 | A1 | 9/2021 | Kawamura et al. |
| 2021/0323088 | A1 | 10/2021 | Yokoyama et al. |
| 2022/0355412 | A1 | 11/2022 | Sato |

FOREIGN PATENT DOCUMENTS

| | | |
|---|---|---|
| JP | 2008-110400 A | 5/2008 |
| JP | 2012-236196 A | 12/2012 |
| JP | 2013-501964 | 1/2013 |
| JP | 2013-545613 | 12/2013 |
| JP | 2015-196169 | 11/2015 |
| JP | 2018-501964 | 1/2018 |
| WO | 2011/059536 | 5/2011 |

* cited by examiner

FIG. 16

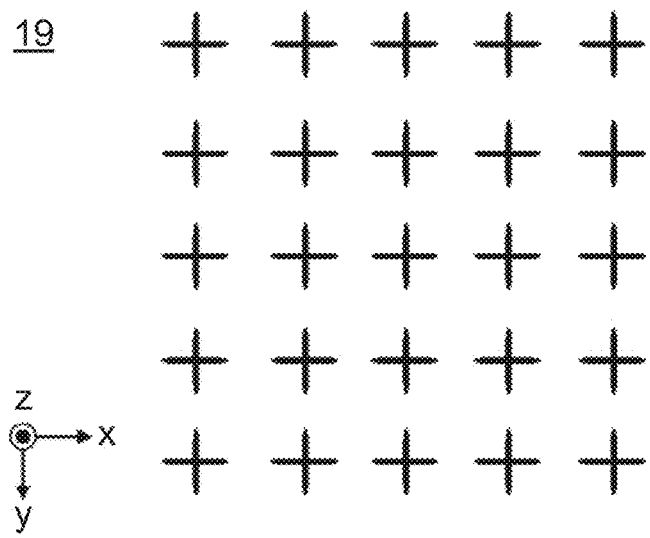

FIG. 17

| DATA NUMBER k | LASER OUTPUT DATA $L_k$ | PROCESSING POINT POSITION $x_k$ | PROCESSING POINT POSITION $y_k$ | SCANNING ANGLE $\varphi x_k$ | SCANNING ANGLE $\varphi y_k$ | CORRECTION ANGLE $\psi x_k$ | CORRECTION ANGLE $\psi y_k$ |
|---|---|---|---|---|---|---|---|
| 0 | $L_0$ | $x_0$ | $y_0$ | $\varphi x_0$ | $\varphi y_0$ | $\psi x_0$ | $\psi y_0$ |
| 1 | $L_1$ | $x_1$ | $y_1$ | $\varphi x_1$ | $\varphi y_1$ | $\psi x_1$ | $\psi y_1$ |
| 2 | $L_2$ | $x_2$ | $y_2$ | $\varphi x_2$ | $\varphi y_2$ | $\psi x_2$ | $\psi y_2$ |
| ⋮ | | | | | | | |
| k-1 | $L_{k-1}$ | $x_{k-1}$ | $y_{k-1}$ | $\varphi x_{k-1}$ | $\varphi y_{k-1}$ | $\psi x_{k-1}$ | $\psi y_{k-1}$ |
| k | $L_k$ | $x_k$ | $y_k$ | $\varphi x_k$ | $\varphi y_k$ | $\psi x_k$ | $\psi y_k$ |
| k+1 | $L_{k+1}$ | $x_{k+1}$ | $y_{k+1}$ | $\varphi x_{k+1}$ | $\varphi y_{k+1}$ | $\psi x_{k+1}$ | $\psi y_2$ |
| ⋮ | | | | | | | | ns
LASER PROCESSING APPARATUS AND LASER PROCESSING METHOD

BACKGROUND

1. Technical Field

The present disclosure relates to a laser processing apparatus and a laser processing method.

2. Description of the Related Art

For example, PCT Japanese Translation Patent Publication No. 2018-501964 (hereinafter, referred to as "Patent Document 1") discloses a laser processing apparatus. The laser processing apparatus measures a depth of a keyhole generated during metal processing with laser light by using an optical coherence tomography (OCT) technique of visualizing an internal structure of a sample by using an optical coherence tomography.

Hereinafter, a laser processing apparatus in Patent Document 1 will be described with reference to FIG. 26. FIG. 26 is a diagram schematically illustrating a configuration of a laser processing apparatus disclosed in Patent Document 1.

As illustrated in FIG. 26, processing laser light 107 and measurement light 105 are introduced into welding head 108. Measurement light 105 has a coaxial configuration of sharing an optical axis with processing laser light 107 via collimator module 106 and dichroic mirror 110.

A measurement instrument is composed of an OCT optical system using an optical coherence tomography including analysis unit 100, optical fiber 101, beam splitter 103, optical fiber 104, reference arm 102, and measurement arm 109. Measurement light 105 is applied through optical fiber 104 as measurement light of the OCT optical system.

Processing laser light 107 and measurement light 105 are collected by condenser lens 111 and are applied to workpiece 112. Workpiece 112 is processed by processing laser light 107. That is, when collected processing laser light 107 is applied to processed portion 113 of workpiece 112, a metal constituting workpiece 112 is molten. Consequently, a keyhole is formed due to the pressure when the molten metal evaporates. Measurement light 105 is applied to a bottom surface of the keyhole.

In this case, an interference signal is generated due to an optical path difference between measurement light 105 (reflected light) reflected at the keyhole and light (reference light) on reference arm 102 side. Consequently, a depth of the keyhole can be obtained on the basis of the interference signal. The keyhole is filled with the surrounding molten metal immediately after formation thereof. Thus, the depth of the keyhole is almost the same as a depth (hereinafter, referred to as a "penetration depth") of a molten part of the metal processed portion. Consequently, the penetration depth of the processed portion 113 can be measured.

In recent years, a laser processing apparatus in which a galvano mirror is combined with an f0 lens has been known. The galvano mirror is a mirror that can finely control a direction in which laser light is reflected. The f0 lens is a lens that collects laser light at a processing point on a surface of a workpiece.

Therefore, a configuration is conceivable in which the method of measuring a depth of a keyhole disclosed in Patent Document 1 is applied to the laser processing apparatus in which the galvano mirror is combined with the f0 lens. In this case, the following problems occur. That is, since wavelengths of the processing laser light and the measurement light are different from each other, chromatic aberration occurs in the f0 lens. Consequently, there is a deviation between irradiation positions of the processing laser light and the measurement light on the surface of the workpiece. Thus, there is concern that a depth of a keyhole cannot be accurately measured with the measurement light.

SUMMARY

The present disclosure provides a laser processing apparatus and a laser processing method capable of accurately measuring a depth of a keyhole. According to an aspect of the present disclosure, there is provided a laser processing apparatus including a laser oscillator that oscillates processing laser light to be applied to a processing point on a processing surface of a workpiece; and an optical interferometer that emits measurement light to be applied to the processing point and generates an optical interference signal based on interference caused by an optical path difference between the measurement light reflected at the processing point and reference light. The laser processing apparatus further includes a first mirror that changes traveling directions of the processing laser light and the measurement light; a second mirror that changes an incidence angle of the measurement light to the first mirror; and a lens that collects the processing laser light and the measurement light at the processing point. The laser processing apparatus further includes a controller that controls the laser oscillator, the first mirror, and the second mirror on the basis of corrected processing data; and a measurement processor that measures a depth of a keyhole generated at the processing point irradiated with the processing laser light, on the basis of the optical interference signal. The corrected processing data is data for eliminating a deviation in an arrival position of at least one of the processing laser light and the measurement light on the processing surface, the deviation being caused by chromatic aberration of the lens, and includes an output instruction value set for each processing point and indicating an oscillation intensity of the processing laser light, a first instruction value indicating an operation amount of the first mirror, and a second instruction value indicating an operation amount of the second mirror. The controller sets a processing section passing through a target position on the processing surface, sets a measurement section centered on the target position in the processing section, and sets a plurality of data acquisition positions that are trajectories perpendicular to a processing direction in the measurement section. The controller acquires pieces of measurement data indicating shapes of keyholes at the respective data acquisition positions during processing of the processing section, projects the pieces of measurement data in the processing direction to be superimposed on each other to create projection data, and obtains the second instruction value in a direction perpendicular to the processing direction at the target position on the basis of the projection data.

According to another aspect of the present disclosure, there is provided a laser processing method performed by a laser processing apparatus including a first mirror that changes traveling directions of processing laser light and measurement light, a second mirror that changes an incidence angle of the measurement light to the first mirror, and a lens that collects the processing laser light and the measurement light at a processing point on a processing surface of a workpiece. In the laser processing method, the laser processing apparatus controls the first mirror and the second mirror to irradiate the workpiece with the processing laser light and the measurement light on the basis of corrected processing data, and measures a depth of a keyhole generated at the processing point irradiated with the processing laser light, on the basis of interference caused by an optical path difference between the measurement light reflected at the processing point and reference light. The corrected processing data is data for eliminating a deviation in an arrival position of at least one of the processing laser light and the measurement light on the processing surface, the deviation being caused by chromatic aberration of the lens. The data includes an output instruction value set in advance for each processing point and indicating an oscillation intensity of the processing laser light, a first instruction value indicating an operation amount of the first mirror, and a second instruction value indicating an operation amount of the second mirror. The laser processing apparatus sets a processing section passing through a target position on the processing surface, sets a measurement section centered on the target position in the processing section, and sets a plurality of data acquisition positions that are trajectories perpendicular to a processing direction in the measurement section. The laser processing apparatus acquires pieces of measurement data indicating shapes of keyholes at the respective data acquisition positions during processing of the processing section, projects the pieces of measurement data in the processing direction to be superimposed on each other to create projection data, and obtains the second instruction value in a direction perpendicular to the processing direction at the target position on the basis of the projection data.

According to the present disclosure, it is possible to provide a laser processing apparatus and a laser processing method capable of accurately measuring a depth of a keyhole.

BRIEF DESCRIPTION OF THE DRAWINGS

FIG. 16 is a diagram schematically illustrating an example in which cross-shaped processing marks are formed at all processing light lattice points;

FIG. 17 is a diagram illustrating an example of a configuration of corrected processing data;

DETAILED DESCRIPTION

Figure 1:
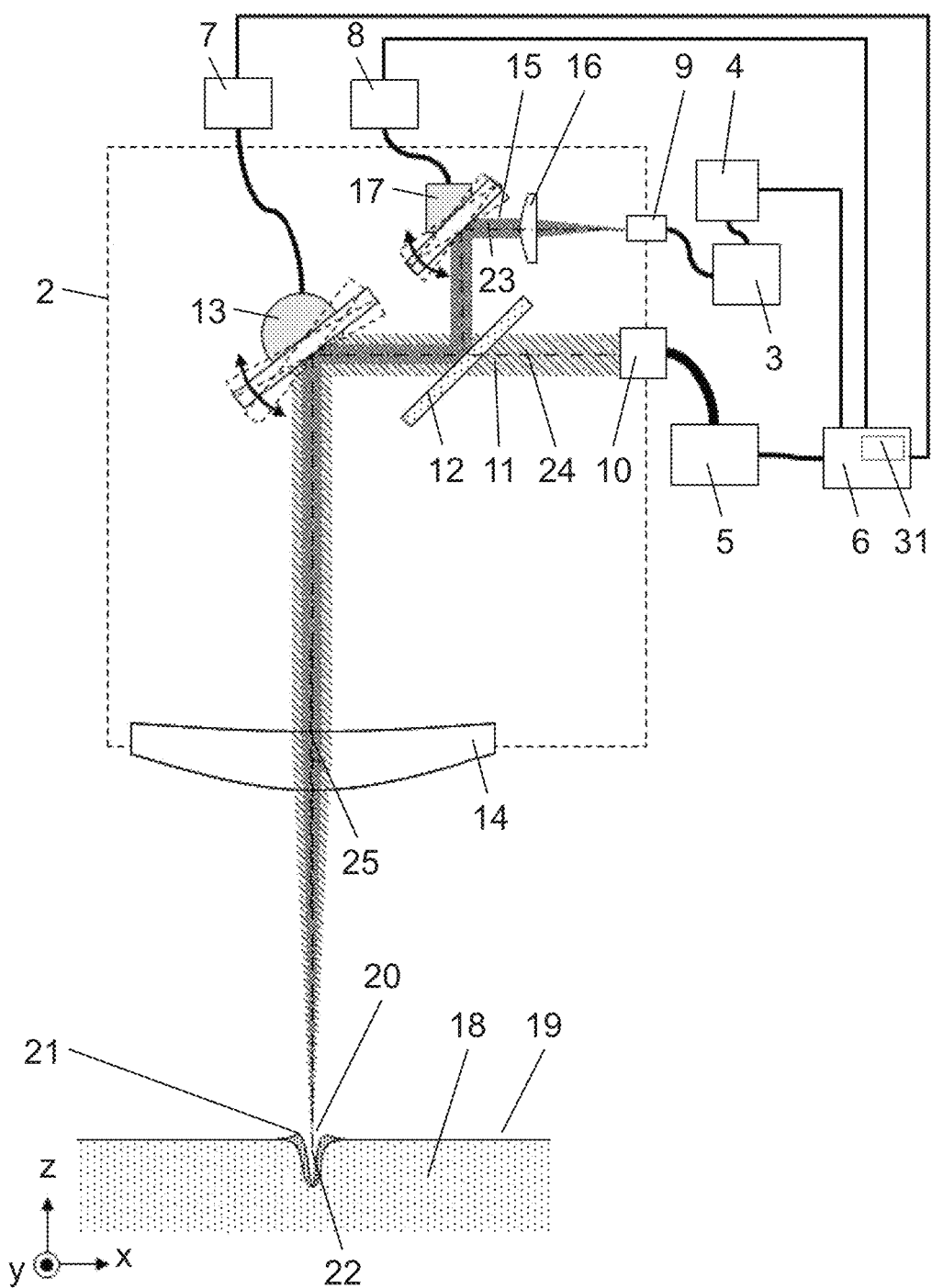
FIG. 1 is a diagram schematically illustrating a configuration of a laser processing apparatus according to an exemplary embodiment of the present disclosure.

Hereinafter, an exemplary embodiment of the present disclosure will be described with reference to the drawings. A constituent common to the respective drawings is given the same reference numeral, and description thereof will not be repeated as appropriate.

Exemplary Embodiment

Hereinafter, a laser processing apparatus according to an exemplary embodiment of the present disclosure will be described separately for each item.

Configuration of Laser Processing Apparatus

First, a configuration of laser processing apparatus 1 according to the exemplary embodiment of the present disclosure will be described with reference to FIG. 1.

FIG. 1 is a diagram schematically illustrating a configuration of laser processing apparatus 1 of the exemplary embodiment.

As illustrated in FIG. 1, laser processing apparatus 1 of the exemplary embodiment includes processing head 2, optical interferometer 3, measurement processor 4, laser oscillator 5, controller 6, first driver 7, second driver 8, and the like.

Optical interferometer 3 emits measurement light 15 for OCT measurement. Emitted measurement light 15 is input to processing head 2 from measurement light introduction port 9 provided on second mirror 17.

Laser oscillator 5 oscillates processing laser light 11 for laser processing. Oscillated processing laser light 11 is input to processing head 2 from processing light introduction port 10.

Processing laser light 11 that is input to processing head 2 is transmitted through dichroic mirror 12 and is reflected by first mirror 13. Reflected processing laser light 11 is transmitted through lens 14 and is collected on processing surface 19 that is a surface of workpiece 18. Consequently, processing point 20 on processing surface 19 of workpiece 18 is subjected to laser processing. In this case, processing point 20 irradiated with processing laser light 11 is molten, and thus molten pool 21 is formed. A molten metal evaporates from formed molten pool 21. Consequently, keyhole 22 is formed in workpiece 18 due to the pressure of a steam generated when the molten metal evaporates.

On the other hand, measurement light 15 that is input to processing head 2 is converted into parallel light by collimate lens 16 and is reflected by second mirror 17. Thereafter, measurement light 15 is reflected by dichroic mirror 12 and is then reflected by first mirror 13. Reflected measurement light 15 is transmitted through lens 14 and is collected at processing point 20 on processing surface 19 of workpiece 18. Collected measurement light 15 is reflected by a bottom surface of keyhole 22 and travels back along the propagation path to reach optical interferometer 3. In this case, measurement light 15 is subjected to optical interference with reference light (not illustrated) in optical interferometer 3 to generate an optical interference signal.

Measurement processor 4 measures a depth of keyhole 22, that is, a penetration depth of processing point 20, on the basis of the optical interference signal generated by optical interferometer 3. Here, the "penetration depth" indicates a distance between the highest apex of the molten portion of workpiece 18 and processing surface 19.

In general, a wavelength of processing laser light 11 and a wavelength of measurement light 15 are different from each other. Specifically, in a case where, for example, a YAG laser or a fiber laser is used for processing laser light 11, the wavelength of processing laser light 11 is 1064 nm. On the other hand, in a case where an OCT light source is used for measurement light 15, the wavelength of measurement light 15 is 1300 nm.

Dichroic mirror 12 has characteristics of transmitting light having the wavelength of processing laser light 11 therethrough and reflecting light having the wavelength of measurement light 15.

First mirror 13 and second mirror 17 are configured with movable mirrors capable of rotationally operating about two or more axes. First mirror 13 and second mirror 17 are, for example, galvano mirrors. The two axes correspond to, for example, an x axis and a y axis illustrated in FIG. 1.

First mirror 13 and second mirror 17 are connected to controller 6 via first driver 7 and second driver 8, respectively, and are operated under the control of controller 6. Specifically, first driver 7 operates first mirror 13 on the basis of an instruction from controller 6. Second driver 8 operates second mirror 17 on the basis of the instruction from controller 6.

Controller 6 includes memory 31. Memory 31 stores processing data for performing desired processing on workpiece 18 and correction data for performing correction described later.

As an example, FIG. 1 illustrates only a rotation operation about a rotation axis in a y direction for each of first mirror 13 and second mirror 17 (refer to a dotted line portion and a double-headed arrow in FIG. 1). However, actually, each of first mirror 13 and second mirror 17 is configured to be capable of rotationally operating about two or more axes as described above. Thus, each of first mirror 13 and second mirror 17 can rotationally operate about a rotation axis in an x direction (refer to an arrow x in FIG. 1).

Hereinafter, for simplification of description, the description will be made of a case where each of first mirror 13 and second mirror 17 performs only a rotation operation about the rotation axis in the y direction (refer to an arrow y in FIG. 1).

When second mirror 17 is located at the origin position, as illustrated in FIG. 1, measurement optical axis 23 of measurement light 15 is reflected by dichroic mirror 12 and then matches processing optical axis 24 of processing laser light 11.

When first mirror 13 is located at the origin position, as illustrated in FIG. 1, processing optical axis 24 of processing laser light 11 is reflected by first mirror 13 and then matches lens optical axis 25 that is the center of lens 14 when being transmitted through lens 14.

In the following description, a position (corresponding to an irradiation position) where processing laser light 11 and measurement light 15 that have been transmitted through the center of lens 14 reach processing surface 19 of workpiece 18 will be referred to as a "processing origin 26" (refer to FIG. 2). That is, origin positions of first mirror 13 and second mirror 17 are respective positions where processing laser light 11 and measurement light 15 are transmitted through the center of lens 14.

Lens 14 is a lens collecting processing laser light 11 and measurement light 15 at processing point 20. Lens 14 is, for example, an f0 lens.

First mirror 13 and lens 14 configure a general optical scanning system including a galvano mirror and an f0 lens. Thus, first mirror 13 is rotated by a predetermined angle from the origin position, and thus an arrival position of processing laser light 11 on processing surface 19 can be controlled. Hereinafter, an angle by which first mirror 13 is rotated from the origin position will be referred to as an "operation amount of first mirror 13". An operation amount of first mirror 13 can be uniquely set when a positional relationship among respective optical members configuring processing head 2 and a distance from lens 14 to processing surface 19 are determined. Consequently, processing laser light 11 can be applied to desired processing point 20.

In this case, the distance from lens 14 to processing surface 19 is preferably a distance at which a focal position where processing laser light 11 is most collected matches processing surface 19. Consequently, processing of workpiece 18 using processing laser light 11 can be performed most efficiently. The distance from lens 14 to processing surface 19 is not limited to this, and may be determined to be any appropriate distance according to a processing application.

An operation amount of first mirror 13 is changed on the basis of a predetermined operation schedule. Consequently, any position of processing point 20 on processing surface 19 can be scanned and irradiated with processing laser light 11.

Controller 6 controls switching between On and Off of laser oscillator 5. Consequently, any position on processing surface 19 can be subjected to laser processing in any pattern within a scannable range of processing laser light 11.

Influence of Chromatic Aberration

Next, the influence of chromatic aberration of lens 14 will be described with reference to FIG. 2.

Figure 2:
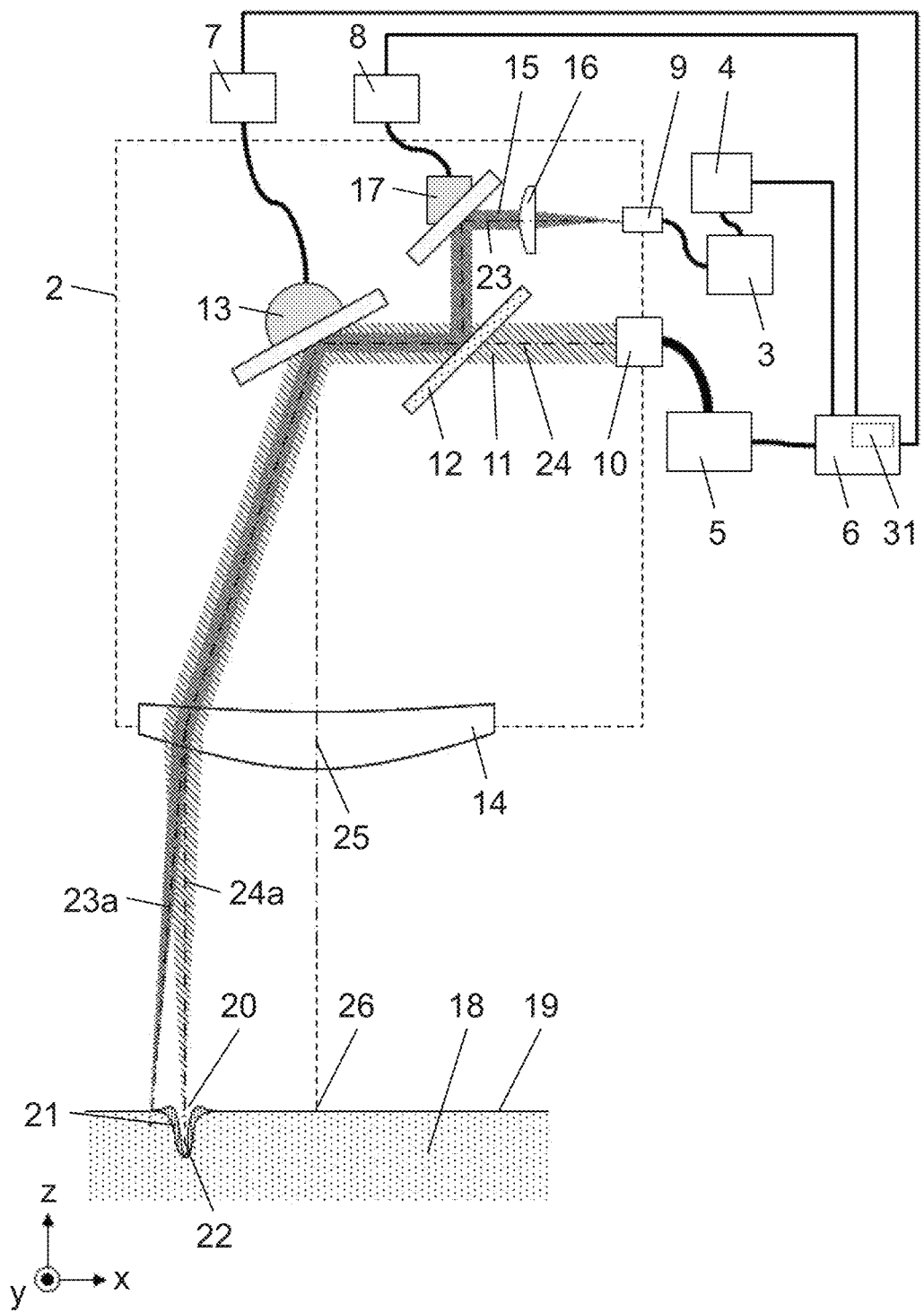
FIG. 2 is a diagram schematically illustrating the laser processing apparatus in a state in which a first mirror is operated from an origin position.

FIG. 2 is a diagram schematically illustrating laser processing apparatus 1 in a state in which first mirror 13 is operated from the origin position. In FIG. 2, it is assumed that second mirror 17 is located at the origin position.

As illustrated in FIG. 2, processing laser light 11 and measurement light 15 reflected by first mirror 13 travel on the same optical axis until reaching lens 14. However, there is a deviation between traveling directions of processing laser light 11 and measurement light 15 after being transmitted through lens 14. That is, as illustrated in FIG. 2, processing optical axis 24a that is an optical axis of processing laser light 11 and measurement optical axis 23a that is an optical axis of measurement light 15 are deviated from each other. Thus, measurement light 15 reaches a position different from processing point 20.

This is caused by the chromatic aberration of lens 14. The chromatic aberration is aberration that occurs because a general optical material including a lens 14 has the property that a refractive index with respect to a wavelength of light differs.

There are two types of chromatic aberration such as axial chromatic aberration and chromatic aberration of magnification. The axial chromatic aberration is aberration caused by the property that a focal position of the lens differs depending on a wavelength of light. On the other hand, the chromatic aberration of magnification is aberration caused by the property that an image height on a focal plane (processing surface 19) differs depending on a wavelength of light. The deviation between the traveling directions of processing laser light 11 (processing optical axis 24a) and measurement light 15 (measurement optical axis 23a) after being transmitted through lens 14 illustrated in FIG. 2 is caused by the chromatic aberration of magnification.

In this case, the axial chromatic aberration also occurs in laser processing apparatus 1 of the exemplary embodiment. However, a deviation between processing laser light 11 and measurement light 15 due to the axial chromatic aberration can be coped with by adjusting a distance between collimate lens 16 and measurement light introduction port 9. That is, collimate lens 16 can suppress the occurrence of the axial chromatic aberration by slightly changing measurement light 15 immediately after being transmitted from a state of parallel light to a state of divergence or convergence.

In FIG. 2, when viewed from processing origin 26, a position where measurement light 15 reaches processing surface 19 is farther than a position where processing laser light 11 reaches processing surface 19. However, the above positional relationship is an example. That is, depending on a lens configuration of lens 14 or a magnitude relationship between wavelengths of processing laser light 11 and measurement light 15, measurement light 15 may reach a position closer to processing origin 26 than processing laser light 11. In general, long-wavelength light reaches a position farther from processing origin 26.

As a method of correcting the chromatic aberration of magnification, for example, there is a method of giving lens 14 the property of an achromatic lens. However, if lens 14 is to have both the properties of an f$\theta$ lens and an achromatic lens, a highly advanced optical design technique is required. Thus, it takes a lot of time and cost to design lens 14.

Therefore, in laser processing apparatus 1 of the exemplary embodiment, as described below, second mirror 17 is operated (moved) to achieve correction of the chromatic aberration of magnification at low cost.

Method of Correcting Chromatic Aberration of Magnification

Next, a method for correcting the chromatic aberration of magnification of lens 14 described above will be described with reference to FIG. 3.

Figure 3:
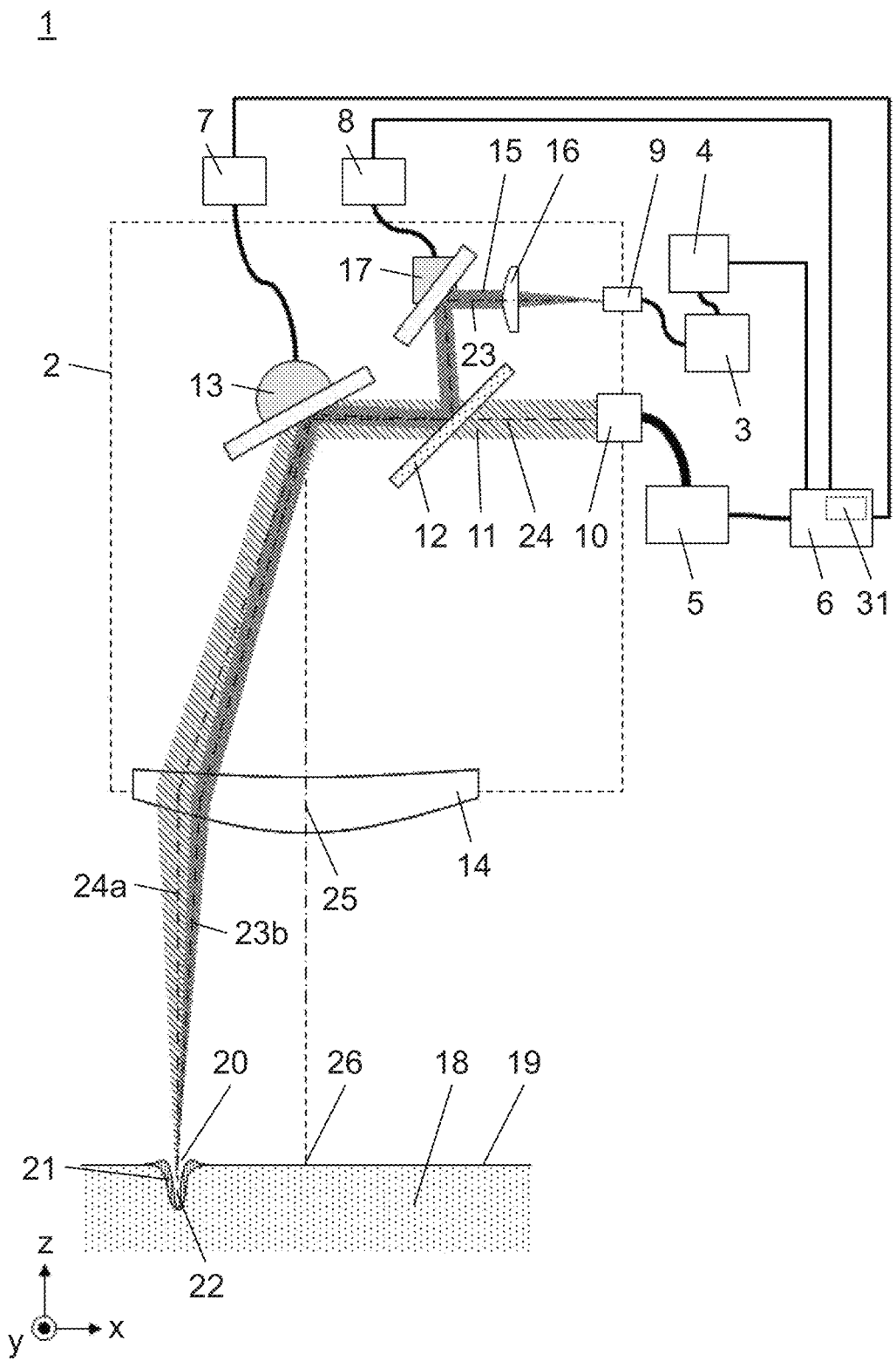
FIG. 3 is a diagram schematically illustrating the laser processing apparatus in a state in which a deviation between arrival positions of processing laser light and measurement light due to chromatic aberration of magnification is corrected.

FIG. 3 is a diagram schematically illustrating laser processing apparatus 1 in a state in which a deviation between arrival positions of processing laser light 11 and measurement light 15 due to the chromatic aberration of magnification is corrected.

In FIG. 3, second mirror 17 is operated by a predetermined operation amount (operation angle) from the origin position. Consequently, as illustrated in FIG. 3, processing optical axis 24 of processing laser light 11 and measurement optical axis 23 of measurement light 15 are not coaxial between dichroic mirror 12 and lens 14. However, processing laser light 11 and measurement light 15 after being transmitted through lens 14 each reach the same position on processing surface 19, that is, processing point 20.

In this case, as illustrated in FIG. 3, processing optical axis 24a of processing laser light 11 passes through the same position as processing optical axis 24a illustrated in FIG. 2. On the other hand, measurement optical axis 23b of measurement light 15 corrected through the operation of second mirror 17 described above passes through a different position from measurement optical axis 23a illustrated in FIG. 2.

An operation amount of second mirror 17 (that is, an angle by which second mirror 17 is rotated from its origin position) is correlated with an operation amount of first mirror 13 in a one-to-one relationship. In this case, an operation amount of first mirror 13 is uniquely determined by a position of processing point 20. Thus, an operation amount of second mirror 17 is also uniquely determined by the position of processing point 20.

In the following description, an operation amount of second mirror 17 will be referred to as a "correction angle" (corresponding to a "second instruction value" described later), and a method of obtaining the correction angle will be described.

Relationship between Correction Angle and Scanning Angle

Next, a relationship between a correction angle of second mirror 17 and a scanning angle of first mirror 13 will be described.

Here, a focal length of lens 14 is indicated by f, an angle of light incident to lens 14 from lens optical axis 25 is indicated by $\theta$, and a distance (hereinafter, also referred to as an "image height") from the optical axis on an image plane of a light beam transmitted through lens 14 is indicated by h. In this case, in lens 14 that is an f$\theta$ lens, a relationship of h=f$\theta$ is established.

As described above, first mirror 13 has two axes about which a rotation operation is performed.

Therefore, the two axes are the x axis and the y axis, and an angle of an x axis component from lens optical axis 25 of light reflected by first mirror 13 is indicated by $\theta$x, and an angle of a y axis component from lens optical axis 25 is indicated by $\theta$y. In a case where the image heights in the x direction and the y direction on the image plane are x and y, respectively, a relationship of x=fθx and y=fθy is established. Consequently, assuming that a position where processing laser light 11 reaches processing surface 19 is indicated by (x, y), (x, y)=(fθx, fθy).

An emission angle of reflected light from the mirror when the light is incident to the mirror changes by twice the amount of the angle. Thus, in a case where an operation amount of first mirror 13 is indicated by (φx, φy), a relationship of (2φx, 2φy)=(θx, θy) is established. In the following description, the operation amount (φx, φy) of first mirror 13 will be referred to as a "scanning angle" (corresponding to a "first instruction value" described later).

As described above, in laser processing apparatus 1 of the exemplary embodiment, when the scanning angle (φx, φy) of first mirror 13 is determined, an arrival position of processing laser light 11 on processing surface 19, that is, the position (x, y) of processing point 20 is also determined.

As described above, the scanning angle is uniquely determined by the position of processing point 20. Similarly, the correction amount of second mirror 17 is uniquely determined by the position of processing point 20.

Therefore, in the exemplary embodiment, a relationship between the scanning angle and the correction amount is calculated in advance for each predetermined position of processing point 20. At the time of processing, second mirror 17 is operated by a correction amount corresponding to a position of processing point 20. Consequently, it is possible to correct a deviation of an irradiation position of measurement light 15 relative to an irradiation position of processing laser light 11 due to the chromatic aberration of magnification of lens 14.

Correction Number Table Data

Next, correction number table data will be described.

The correction number table data is data (an example of corrected processing data) indicating a correspondence relationship between a scanning angle and a correction angle for each processing point 20.

First, with reference to FIG. 4, respective trajectories of processing laser light 11 and measurement light 15 on processing surface 19 of workpiece 18 will be described.

Figure 4:
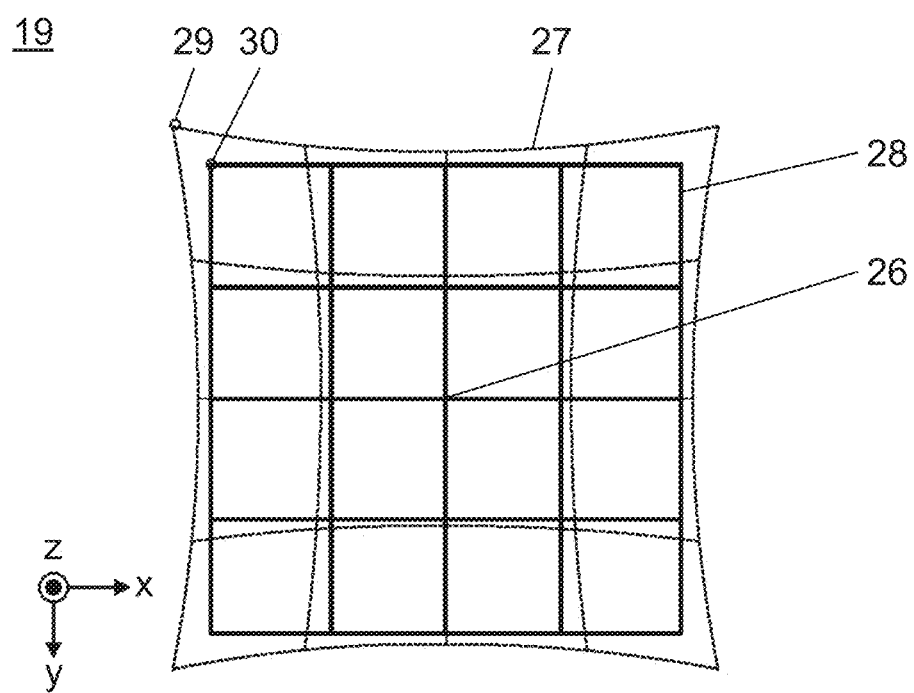
FIG. 4 is a diagram schematically illustrating trajectories of the processing laser light and the measurement light on a processing surface when a surface of a workpiece is scanned in a lattice shape by operating only the first mirror.

FIG. 4 is a diagram schematically illustrating respective trajectories of processing laser light 11 and measurement light 15 on processing surface 19 in a case where processing surface 19 of workpiece 18 is scanned in a lattice shape by operating only first mirror 13 without operating second mirror 17.

FIG. 4 illustrates a state in which processing surface 19 is viewed from lens 14 side. In FIG. 4, processing light trajectory 28 that is a trajectory of processing laser light 11 is indicated by a solid line, and measurement light trajectory 27 that is a trajectory of measurement light 15 is indicated by a dotted line.

In the example illustrated in FIG. 4, since second mirror 17 is not operated, the trajectories of processing laser light 11 and measurement light 15 when the chromatic aberration of magnification is not corrected are illustrated. Thus, the trajectories of processing laser light 11 and measurement light 15 match each other in the vicinity of processing origin 26. However, due to the chromatic aberration of magnification, a deviation between the trajectories of the two increases as a distance from processing origin 26 increases. That is, processing light trajectory 28 draws a lattice pattern without distortion. On the other hand, measurement light trajectory 27 draws a distorted pincushion trajectory. The shape of measurement light trajectory 27 illustrated in FIG. 4 is an example. That is, the distorted shape of measurement light trajectory 27 changes depending on optical characteristics of lens 14.

Amounts of positional deviations respectively corresponding to processing light trajectory 28 and measurement light trajectory 27 also depend on the optical characteristics or the optical design of lens 14. As a general example, in a case of a commercially available fθ lens having a focal length of lens 14 of 250 mm and a processing surface region of about 200 mm in diameter, the trajectories of processing laser light 11 and measurement light 15 are deviated by 0.2 mm to 0.4 mm around the outermost periphery of the processing surface region.

On the other hand, a diameter of keyhole 22 (for example, refer to FIG. 1) generated by irradiating processing point 20 with processing laser light 11 depends on the power of the processing laser light, the spatial coherency, and the condensing ability of lens 14, but is as small as 0.03 mm to 0.2 mm. Thus, there is a case where measurement light 15 may not reach the bottom surface of keyhole 22 due to the positional deviation between processing laser light 11 and measurement light 15 caused by the chromatic aberration of lens 14. Consequently, an accurate penetration depth cannot be measured with measurement light 15.

FIG. 4 illustrates, as an example, a lattice pattern of 4×4 squares at equal intervals, but the present disclosure is not limited thereto. The lattice pattern for scanning may be set, for example, as a lattice pattern having a finer number of squares. In relation to the chromatic aberration of magnification characteristic of the fθ lens, a lattice interval of the lattice pattern may be narrowed, especially in a region where accuracy is required. A radial lattice pattern may be set. However, in the exemplary embodiment, since the correction angle is set on the two axes such as the x axis and the y axis, the orthogonal lattice pattern illustrated in FIG. 4 is more preferable.

Therefore, when processing light trajectory 28 and measurement light trajectory 27 illustrated in FIG. 4 are compared with each other, it can be seen that a deviation occurs at each corresponding lattice point of the lattice pattern.

That is, in order to create the correction number table data, it is necessary to determine a correction amount such that processing light lattice point 30 that is one lattice point on processing light trajectory 28 matches corresponding measurement light lattice point 29 of measurement light trajectory 27.

Correction Angle Calculation Method

Next, a description will be made of a method of calculating a correction angle at a predetermined lattice point position with reference to FIG. 5.

Figure 5:
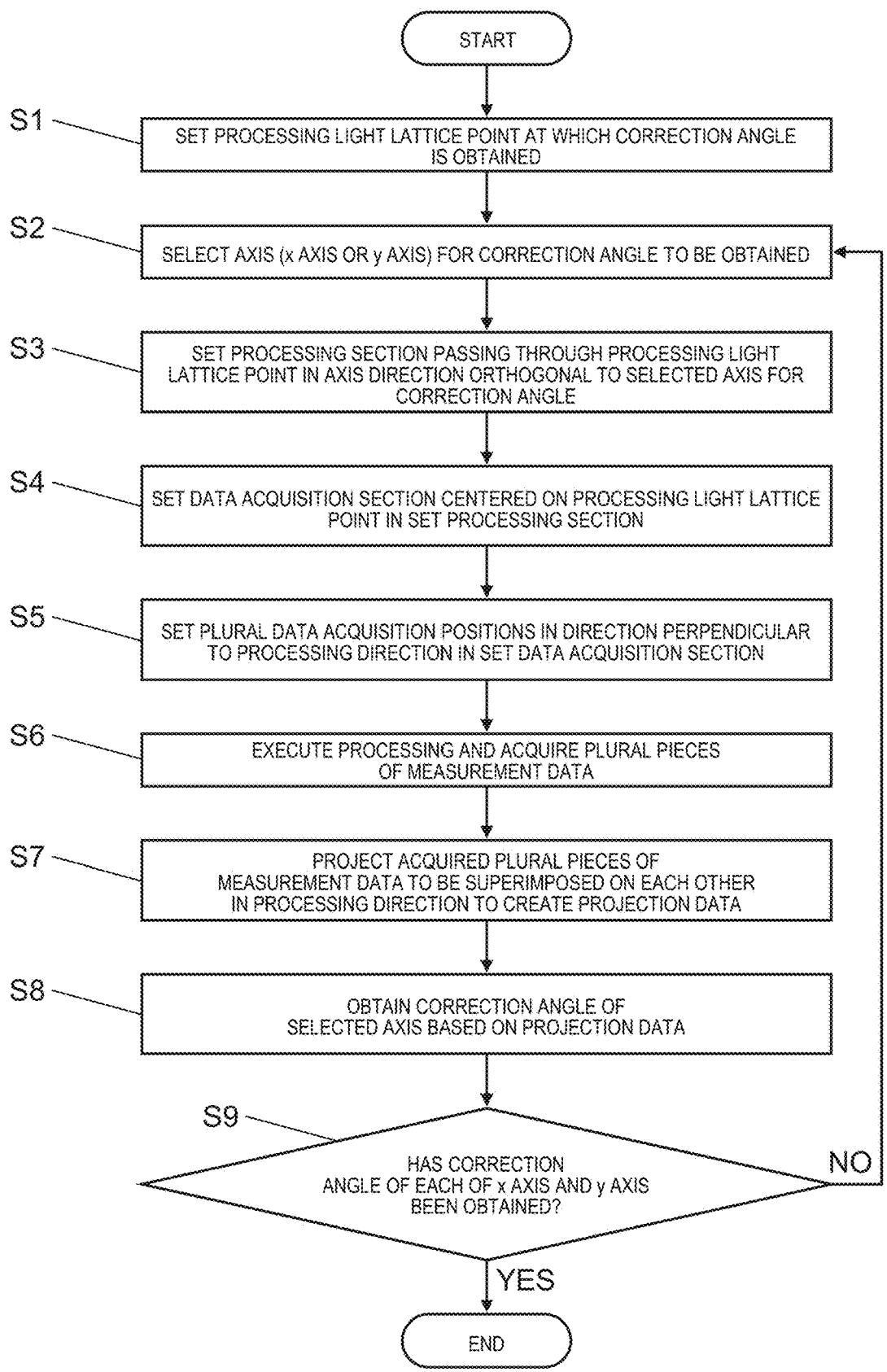
FIG. 5 is a flowchart illustrating a method of calculating a correction angle at a predetermined processing light lattice point.

FIG. 5 is a flowchart illustrating a method of calculating a correction angle at predetermined processing light lattice point 30.

In the following, for simplification of description, the description will be made assuming that the x axis of first mirror 13 and the x axis of second mirror 17 match each other, and the y axis of first mirror 13 and the y axis of second mirror 17 match each other. The description will be made assuming that a scanning angle of first mirror 13 is indicated by (φx, φy), and a correction angle of second mirror 17 is indicated by (ψx, ψy).

As illustrated in FIG. 5, first, controller 6 of laser processing apparatus 1 sets processing light lattice point 30 (an example of a target position) at which the correction angle is obtained (step S1).

Next, controller 6 selects an axis for the correction angle to be obtained (step S2).

Specifically, for example, in the lattice pattern illustrated in FIG. 4, the x axis or the y axis is selected. In the following description, a case where the y axis is selected as the axis for the correction angle to be obtained will be described as an example. When the x axis is selected, the x axis and the y axis may be interchanged and interpreted in the following description.

Figure 6:
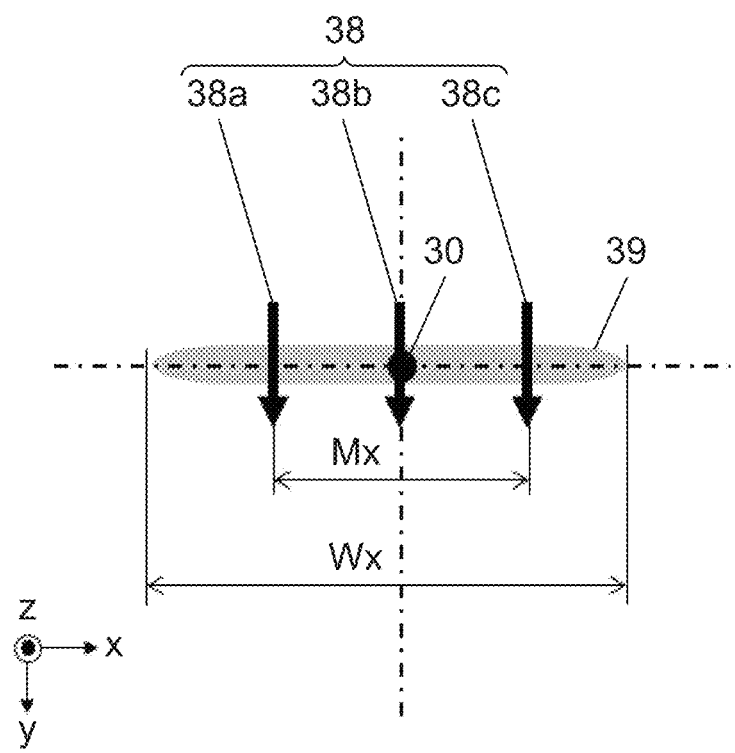
FIG. 6 is a diagram schematically illustrating an example of a processing section and a data acquisition section that are set when a y axis is selected as an axis of the correction angle to be obtained.

Next, controller 6 sets processing section Wx passing through processing light lattice point 30 in an axis direction orthogonal to the selected axis for the correction angle, for example, as illustrated in FIG. 6 (step S3).

FIG. 6 is a diagram schematically illustrating examples of processing section Wx and data acquisition section Mx (details thereof will be described later) set when the y axis is selected as the axis of the correction angle to be obtained. Specifically, for example, in step S3, as illustrated in FIG. 6, processing section Wx passing through processing light lattice point 30 in the x axis direction orthogonal to the selected y axis is set. Consequently, an operation schedule of first mirror 13 at the time of processing execution is determined.

Next, controller 6 sets data acquisition section Mx (an example of a measurement section) centered on processing light lattice point 30 in set processing section Wx (step S4). Specifically, for example, in step S4, as illustrated in FIG. 6, data acquisition section Mx centered on processing light lattice point 30 is set within a range of set processing section Wx.

Next, controller 6 sets plurality of data acquisition positions 38 in a direction perpendicular to the processing direction in set data acquisition section Mx (step S5). Specifically, for example, in step S5, as illustrated in FIG. 6, data acquisition positions 38 (38a, 38b, and 38c) in the y axis direction orthogonal to the processing direction (the direction of processing section Wx; for example, the x axis direction) are set within the range of set data acquisition section Mx.

In this case, scanning of data acquisition positions 38 in a direction (for example, the y axis direction) perpendicular to the processing direction is performed through an operation of only second mirror 17. A scanning range of second mirror 17 is constant regardless of data acquisition positions 38. That is, positions of data acquisition positions 38 in the processing direction are determined as positions of first mirror 13 at the time of processing. Consequently, an operation schedule of second mirror 17 is determined such that second mirror 17 is operated only at designated data acquisition positions 38, as illustrated in FIG. 7, for example.

Figure 7:
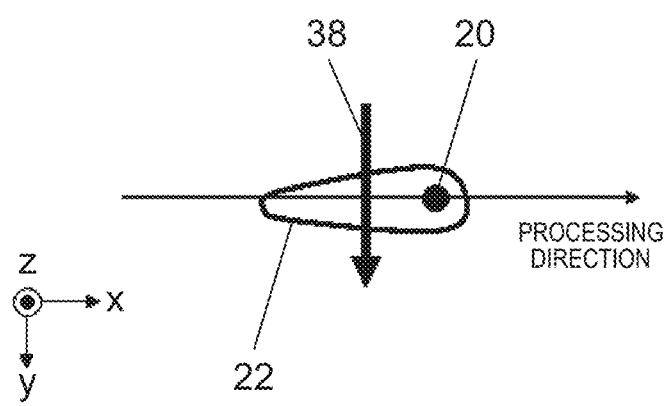
FIG. 7 is a diagram schematically illustrating a relationship between a processing point at the time of processing and a data acquisition position.

FIG. 7 is a diagram schematically illustrating a relationship between processing point 20 and data acquisition position 38 during processing.

As illustrated in FIG. 7, data acquisition position 38 is a trajectory orthogonal to the processing direction (for example, the x axis direction) on keyhole 22. A positional relationship between processing point 20 and data acquisition position 38 in the processing direction is the same except for the influence of the positional deviation between processing laser light 11 and measurement light 15 due to the chromatic aberration of magnification of lens 14. Thus, data acquisition position 38a, data acquisition position 38b, and data acquisition position 38c illustrated in FIG. 6 are substantially the same positions (including the same positions) in the processing direction on keyhole 22.

In FIG. 6, the case where data acquisition position 38 is set at three locations such as data acquisition position 38a, data acquisition position 38b, and data acquisition position 38c is illustrated as an example, but, actually, it is preferable to set data acquisition positions 38 more than three.

It is preferable to set a scanning range of data acquisition positions 38 in the direction perpendicular to the processing direction as follows. Specifically, first, a correction angle at which measurement light 15 is located at processing light lattice point 30 is obtained through optical simulation. A scanning range of data acquisition positions 38 is set centered on the obtained correction angle. Consequently, a difference between a position of processing point 20 and a position of data acquisition position 38 in the processing direction illustrated in FIG. 7 is a difference between a correction angle obtained through the optical simulation and an actual correction angle. Consequently, a position of keyhole 22 can be measured at a position closer to processing point 20.

Hereinafter, the reason for setting the data acquisition position in the direction perpendicular to the processing direction will be described with reference to FIGS. 8 to 11.

Here, a position of keyhole 22 matches a position of processing laser light 11 at processing point 20. That is, for example, if a center position of a shape of keyhole 22 at processing light lattice point 30 is obtained, measurement light 15 can be caused to match processing light lattice point 30.

FIGS. 8 to 11 respectively illustrate examples of measurement results of a shape of keyhole 22.

Figure 8:
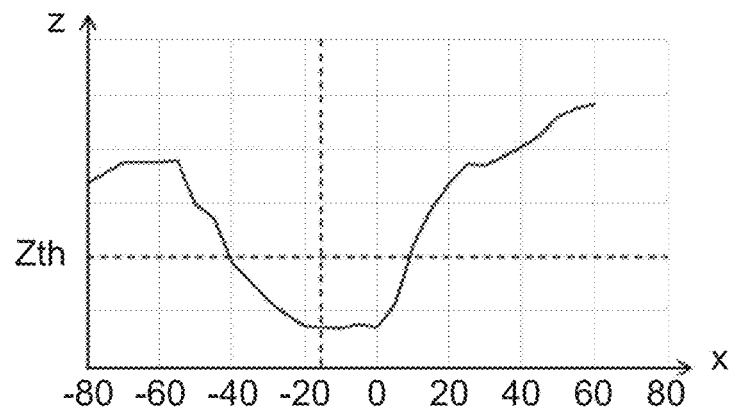
FIG. 8 is a graph illustrating an example of a measurement result of a keyhole shape in an x direction when a processing direction is a +x direction.
Figure 9:
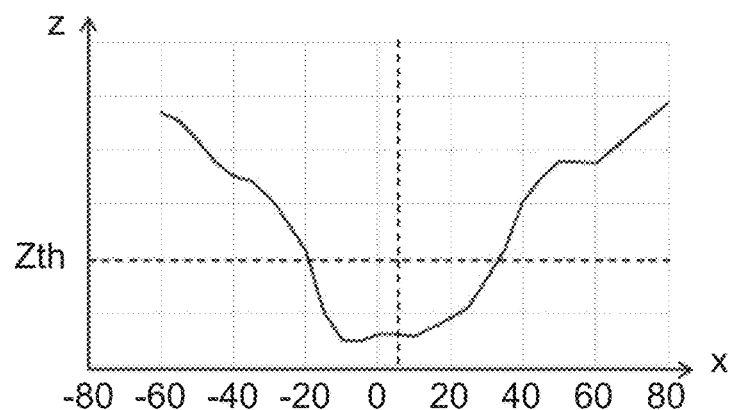
FIG. 9 is a graph illustrating an example of a measurement result of a keyhole shape in the x direction when the processing direction is a −x direction.
Figure 10:
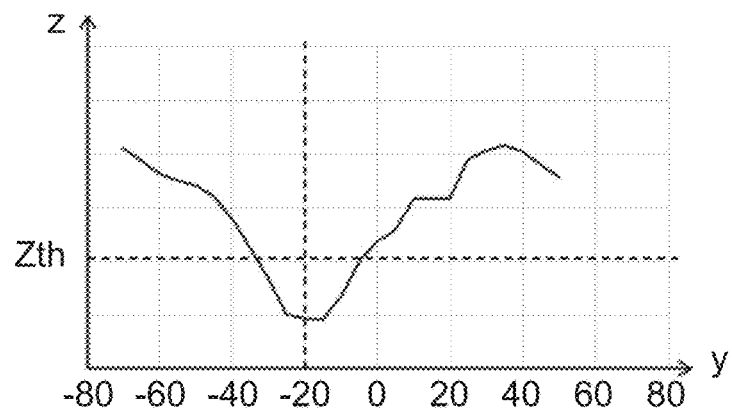
FIG. 10 is a graph illustrating an example of a measurement result of a keyhole shape in the y direction when the processing direction is the +x direction.
Figure 11:
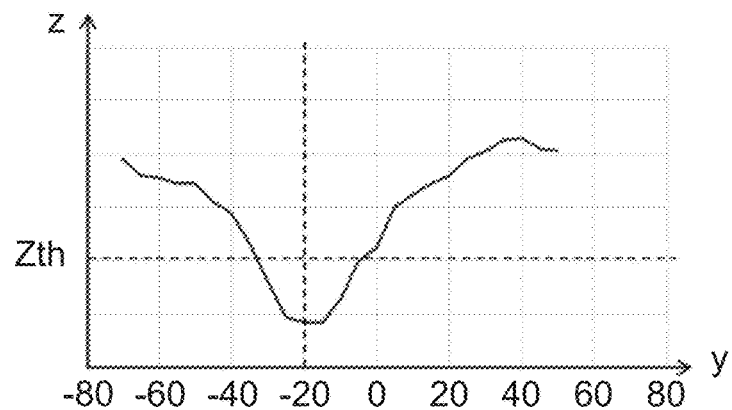
FIG. 11 is a graph illustrating an example of a measurement result of a keyhole shape in the y direction when the processing direction is the −x direction.

Specifically, FIG. 8 is a graph illustrating an example of a result of measuring a shape of keyhole 22 in the x direction with laser processing apparatus 1 in a case where the processing direction is the +x direction. FIG. 9 is a graph illustrating an example of a result of measuring a shape of keyhole 22 in the x direction with laser processing apparatus 1 in a case where the processing direction is the −x direction. FIG. 10 is a graph illustrating an example of a result of measuring a shape of keyhole 22 in the y direction with laser processing apparatus 1 in a case where the processing direction is the +x direction. FIG. 11 is a graph illustrating an example of a result of measuring a shape of keyhole 22 in the y direction with laser processing apparatus 1 in a case where the processing direction is the −x direction.

The measurement results illustrated in FIGS. 8 to 11 respectively show the shapes of keyhole 22 at processing origin 26. The measurement results illustrated in FIGS. 8 to 11 correspond to average output values in a case where measurement is performed a plurality of times according to methods different from that of the exemplary embodiment.

Here, a vertical axis in the figure indicates depth z of keyhole 22 measured by optical interferometer 3. A horizontal axis in the figure indicates a coordinate (unit: μm) of processing surface 19.

First, in order to obtain the center position of keyhole 22, a center position of a shape crossing threshold value Zth in the depth direction was obtained. As a result, center position x of keyhole 22 in the processing direction is −15 μm as illustrated in FIG. 8 in a case where the processing direction is the +x direction. On the other hand, center position x is 5 μm as illustrated in FIG. 9 in a case where the processing direction is the −x direction. That is, it is confirmed that a difference of 20 μm occurs due to a difference in the processing direction.

In general, it is known that keyhole 22 in the processing direction has a such shape in which a skirt is slightly trailed to the rear side in the processing direction due to the influence of viscosity of a molten metal. Thus, it is considered that the above difference is caused by a deviation between the center positions of keyhole 22 due to a difference between the processing directions.

Center position y of keyhole 22 perpendicular to the processing direction is −20 μm as illustrated in FIG. 10 in a case where the processing direction is the +x direction. On the other hand, center position y is −20 μm as illustrated in FIG. 11 in a case where the processing direction is the −x direction That is, it is confirmed that center position y of keyhole 22 is reproduced (same) regardless of a difference between the processing directions.

That is, a position of keyhole 22 can be obtained with higher accuracy by measuring a shape of keyhole 22 perpendicular to the processing direction. Thus, in the exemplary embodiment, data acquisition position 38 is set in the direction perpendicular to the processing direction.

Next, controller 6 executes processing on processing surface 19 and acquires a plurality of pieces of measurement data (step S6). The plurality of pieces of measurement data are data indicating measurement results at plurality of respective data acquisition positions 38.

For example, in a case where the y axis is selected, in step S6, measurement data corresponding to each of data acquisition positions 38a, 38b, and 38c is acquired during processing on processing section Wx illustrated in FIG. 6. When the processing is finished, processing mark 39 (refer to FIG. 14) in the x axis direction is formed in processing section Wx. In a case where the x axis is selected, processing mark 39 (refer to FIG. 14) in the y axis direction is formed.

Next, controller 6 projects the acquired plurality of pieces of measurement data to be superimposed on each other in the processing direction to create projection data (step S7).

Hereinafter, a specific example of step S7 of creating projection data will be described with reference to FIG. 12.

Figure 12:
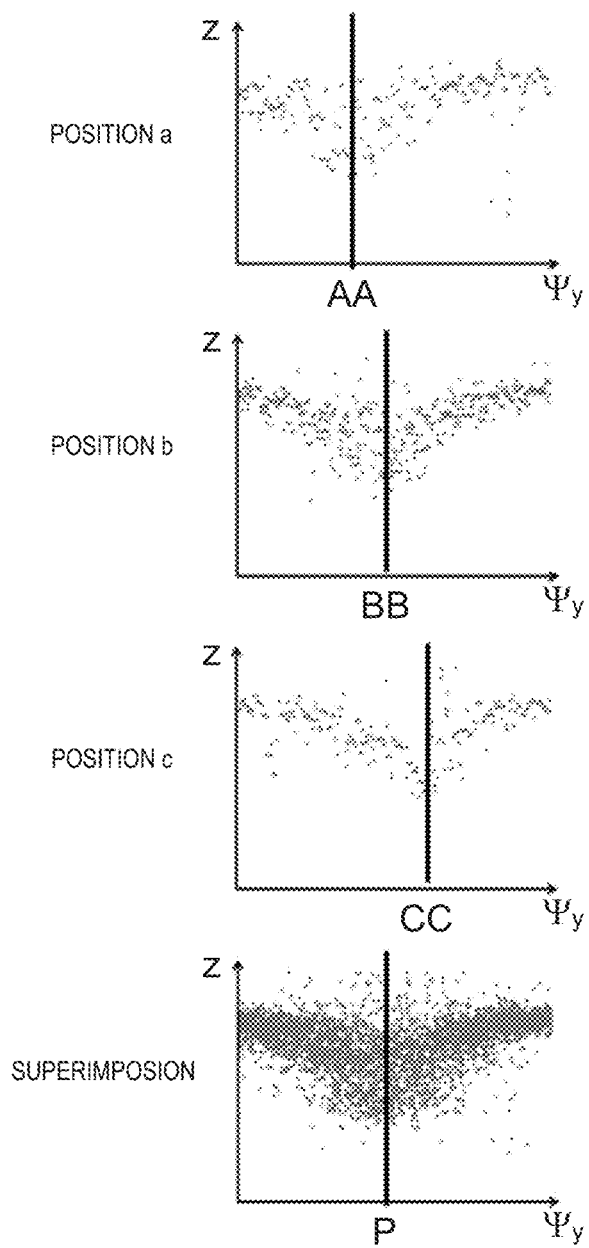
FIG. 12 is a graph for describing an example in which a plurality of pieces of measurement data are superimposed on each other.

FIG. 12 is a graph for describing an example of superimposing a plurality of pieces of measurement data.

Positions a, b, and c illustrated in FIG. 12 respectively correspond to data acquisition positions 38a, 38b, and 38c illustrated in FIG. 6.

In measurement data corresponding to each of data acquisition positions 38a, 38b, and 38c, a vertical axis is represented by depth z (vertical axis) measured by optical interferometer 3, and a horizontal axis is represented by correction angle ψy (horizontal axis) in the scanning direction of data acquisition position 38.

A point group in each graph of position a, position b, and position c is depth data measured by optical interferometer 3 at each position of the ψy coordinate. As illustrated in FIG. 7, data acquisition position 38 is orthogonal to the processing direction on keyhole 22. Thus, the graphs of position a, position b, and position c respectively show the same results as results of measuring cross sections of keyhole 22 orthogonal to the processing direction.

In this case, in order to obtain a correction angle at processing light lattice point 30, a center position of keyhole 22 may be obtained from the graph of position b. However, there are few valid data representing a shape of keyhole 22 in each point group data. Thus, the center position of keyhole 22 cannot be obtained with sufficient accuracy.

The pieces of point group data corresponding to position a, position b, and position c are respectively pieces of data acquired at different scanning angles of lens 14. Thus, ψy coordinate AA, ψy coordinate BB, and ψy coordinate CC of the center positions of keyhole 22 at positions a, b, and c are deviated due to the influence of the chromatic aberration of magnification of lens 14.

Here, the chromatic aberration of magnification may be approximated linearly in a narrow range. Thus, a distance between coordinates AA and BB and a distance between coordinates BB and CC are substantially the same (including the same) as each other centered on coordinate BB of the position b of processing light lattice point 30.

Thus, in the exemplary embodiment, the pieces of point group data in the respective graphs of position a, position b, and position c are superimposed on each other at the same coordinate to create data (refer to a graph illustrated at the bottom of FIG. 12).

That is, as illustrated in FIG. 6, data acquisition positions 38a, 38b, and 38c are orthogonal to processing section Wx. Thus, the superimposed graph illustrated in FIG. 12 is projection data in which the graphs of position a, position b, and position c are projected in the processing direction and superimposed on each other.

In this case, the projection data is obtained by superimposing the distributions of the pieces of point group data at positions a and c evenly deviated to the left and right centered on position b of processing light lattice point 30. Thus, center position P of the projection data matches coordinates BB of the center position at position b of processing light lattice point 30.

Thus, if center position P of the projection data is obtained, a correction angle at processing light lattice point 30 can be obtained. By using the above method, it is possible to increase the number of valid data for obtaining a correction angle at processing light lattice point 30 without being influenced by the chromatic aberration of magnification. Consequently, it is possible to improve the accuracy of measuring a depth of keyhole 22.

Next, controller 6 obtains a correction angle of the selected axis on the basis of the projection data.

Figure 13:
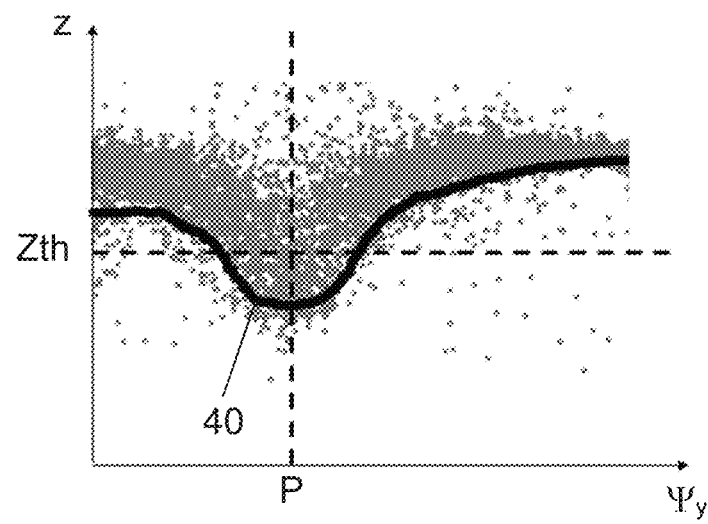
FIG. 13 is a graph for describing an example of obtaining a correction angle on the basis of projection data.

Hereinafter, a specific example of step S8 will be described with reference to FIG. 13. FIG. 13 is a graph for describing an example in which a correction angle is obtained by using the projection data.

Normally, keyhole 22 is formed due to the pressure of steam generated when a molten metal evaporates, and thus a shape thereof is constantly changing. Thus, point group data in the graph of FIG. 13 has a distribution that spreads in the depth z direction. In this case, the bottom of keyhole 22 is at the deepest position. Thus, the vicinity of the lowest point of the point group data is extracted. Consequently, shape distribution 40 of data acquisition position 38 can be obtained.

Specifically, for example, a process of extracting 5 percentile data having a small z value from the point group data present in a certain section in the correction angle ψy axis direction is performed in the correction angle ψy axis direction. Consequently, shape distribution 40 of data acquisition position 38 can be obtained. Center position P of two points at which obtained shape distribution 40 of data acquisition position 38 crosses threshold value Zth in the depth direction is obtained. Consequently, a correction angle of the y axis of processing light lattice point 30 can be obtained.

Next, controller 6 determines whether or not a correction angle of each of the x axis and the y axis about which first mirror 13 and second mirror 17 rotationally operate has been obtained (step S9). In a case where both pieces of data regarding the x axis and y axis have been acquired (YES in step S9), the flow is finished.

On the other hand, in a case where both pieces of data regarding the x axis and y axis data have not been acquired (NO in step S9), the flows returns to step S2. Specifically, for example, in a case where the y axis is selected in step S2 and the correction angle of the y axis is obtained in step S8, the flow returns to step S2 and the x axis is selected in step S2. Thereafter, a correction angle of the x axis is obtained through steps S3 to S8.

Through the flow described above, the correction angle ($\psi x$, $\psi y$) at predetermined processing light lattice point 30 at the scanning angle ($\varphi x$, $\varphi y$) can be obtained.

Figure 14:
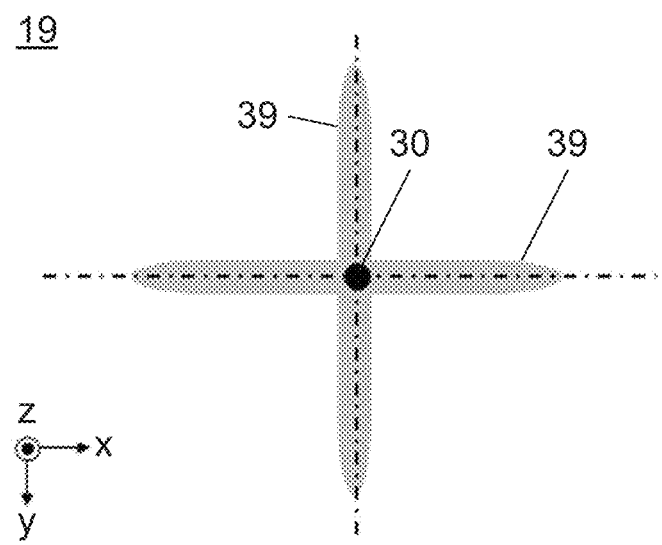
FIG. 14 is a diagram schematically illustrating cross-shaped processing marks intersecting at the processing light lattice point.

After the above-described flow is completed, as illustrated in FIG. 14, cross-shaped processing marks 39 intersecting at processing light lattice point 30 are formed on processing surface 19.

That is, in the above-described method, the correction angle at processing light lattice point 30 can be obtained with the accuracy of 10 µm or less.

Thus, in a case where a laser having excellent beam quality (for example, a single-mode fiber laser) is used in processing head 2 of the present disclosure, the above-described method is suitable. That is, in a case of the single-mode fiber laser, a beam diameter of processing laser light 11 at processing point 20 is 50 µm or less. Thus, the above-described method in which the accuracy of the correction angle at processing light lattice point 30 is 10 µm or less is more effective in a case where the single-mode fiber laser is used.

Method of Creating Correction Number Table Data

Figure 15:
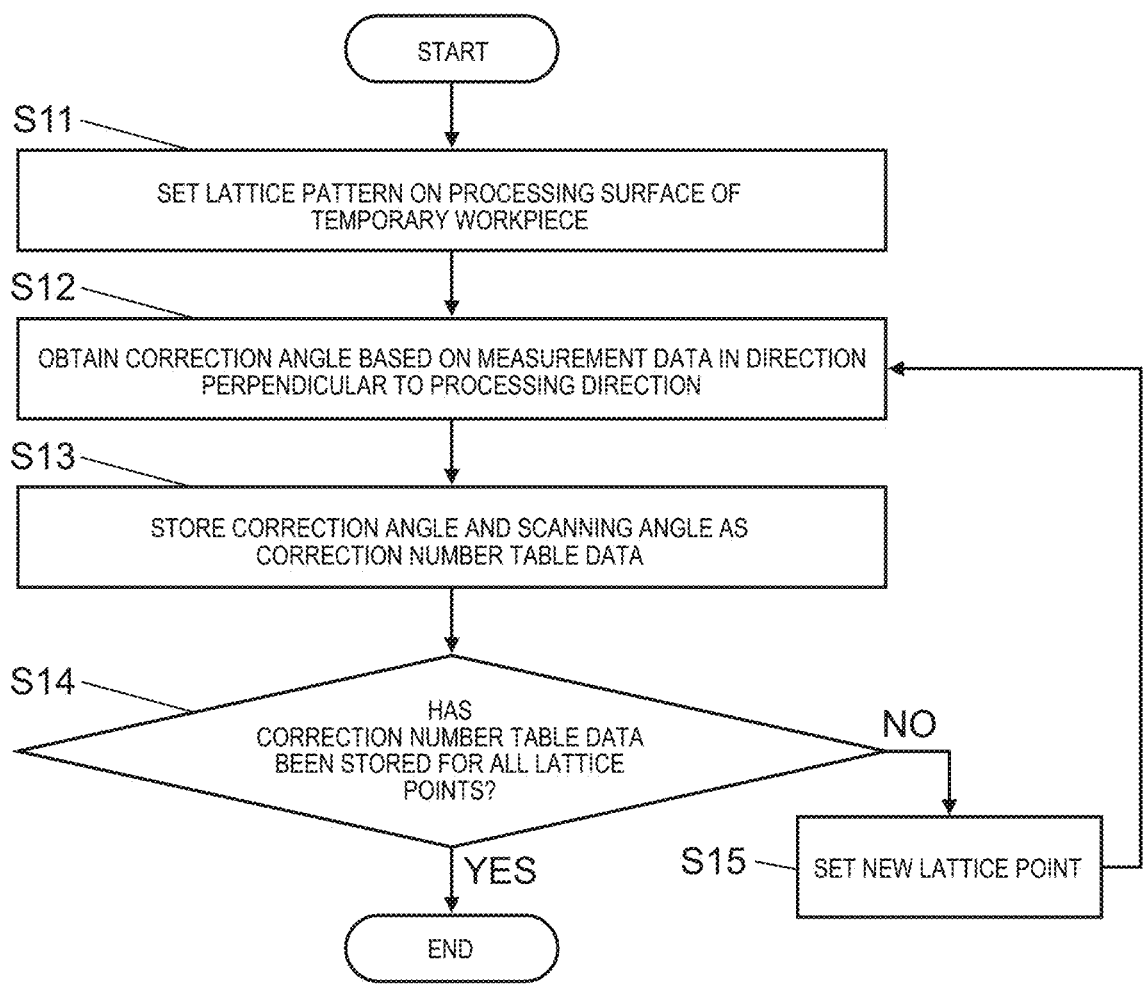
FIG. 15 is a flowchart illustrating a method of creating correction number table data.

Next, a method of creating the correction number table data will be described with reference to FIG. 15. FIG. 15 is a flowchart illustrating a method of creating correction number table data.

As illustrated in FIG. 15, first, controller 6 of laser processing apparatus 1 sets a lattice pattern (for example, processing light trajectory 28 illustrated in FIG. 4) that is a range in which laser processing is performed on processing surface 19 of temporary workpiece 18 (for example, a metal flat plate) (step S11). One lattice point is selected from among a plurality of lattice points included in the lattice pattern.

Next, controller 6 obtains a correction angle on the basis of measurement data in the direction perpendicular to the processing direction by using the method illustrated in FIG. 5 (step S12).

Next, controller 6 stores the correction angle obtained in step S12 and a scanning angle at that time into memory 31 as the correction number table data (step S13).

Next, controller 6 determines whether or not the correction number table data has been stored for all the lattice points of the lattice pattern set in step S11 (step S14). In this case, in a case where the correction number table data is stored for all the lattice points (YES in step S14), controller 6 finishes the flow.

On the other hand, in a case where the correction number table data is not stored for all the lattice points (NO in step S14), controller 6 selects a new lattice point (that is, a lattice point for which the correction number table data is not stored) (step S15). Thereafter, controller 6 returns the flow to step S12 and executes the subsequent steps.

The correction number table data can be obtained through the method described above.

The above-described method is executed, and, thus, as illustrated in FIG. 16, a plurality of cross-shaped processing marks 39 are formed to correspond to all processing light lattice points 30 (refer to FIG. 4) on processing surface 19.

In a case where the lattice pattern set in step S11 is the 4×4 lattice pattern illustrated in FIG. 4, only the correction number table data for 16 lattice points can be created. Thus, as described above, it is more preferable to set a lattice pattern including 16 or more lattice points. Consequently, more pieces of correction number table data can be created.

However, even if a large amount of correction number table data is created, a scanning angle of first mirror 13 may be set to any value as long as the scanning angle is within an operating range on a mechanism. Thus, there is a case where a scanning angle of first mirror 13 may not match created correction number table data. In this case, it is necessary to interpolate the correction number table data to obtain a correction angle.

A method of interpolating the correction number table data to obtain a correction angle will be described later.

Processing Data Next, processing data used for processing workpiece 18 will be described.

In the related art, in a laser processing apparatus having an fθ lens and a galvano mirror, a controller controls a laser oscillator and the galvano mirror by using a plurality of pieces of processing data set in time series. Consequently, processing is performed in a time series on each processing point on a surface of a workpiece. The processing data is, for example, data in which an output instruction value for the laser oscillator and data items of a scanning angle and a processing speed are set for each processing point. Here, the output instruction value indicates an oscillation intensity of processing laser light.

However, in laser processing apparatus 1 of the exemplary embodiment, the data items of the processing data used by laser processing apparatus 1 include not only an output instruction value (laser output data) for laser oscillator 5, a position of processing point 20 (processing point position), and a scanning angle but also a correction angle. In the following description, the processing data to which the correction angle is added as a data item will be described as "corrected processing data".

Hereinafter, an example of the corrected processing data will be described with reference to FIG. 17. FIG. 17 is a diagram illustrating an example of a configuration of corrected processing data.

As illustrated in FIG. 17, the corrected processing data includes data number k, laser output data $L_k$, processing point position $x_k$, processing point position $y_k$, scanning angle $\varphi x_k$, scanning angle $\varphi y_k$, correction angle $\psi x_k$, and correction angle $\psi y_k$ as a set of data items.

Data number k indicates the order of processing data. Laser output data $L_k$ indicates an output instruction value for laser oscillator 5. Processing point position $x_k$ indicates a position of processing point 20 in the x direction. Processing point position $y_k$ indicates a position of processing point 20 in the y direction. Scanning angle $\varphi x_k$ indicates a scanning angle of first mirror 13 that performs scanning in the x direction. Scanning angle $\varphi y_k$ indicates a scanning angle of first mirror 13 that performs scanning in the y direction. Correction angle $\psi x_k$ indicates a correction angle of second mirror 17 that corrects a position of measurement light 15 in the x direction. Correction angle $\psi y_k$ indicates a correction angle of second mirror 17 that corrects a position of measurement light 15 in the y direction.

In FIG. 17, the subscript k attached to each data item other than data number k indicates that a data item corresponds to data number k. The scanning angle in the corrected processing data is an example of a first instruction value. The correction angle in the corrected processing data is an example of a second instruction value.

The corrected processing data is configured as described above.

Figure 18:
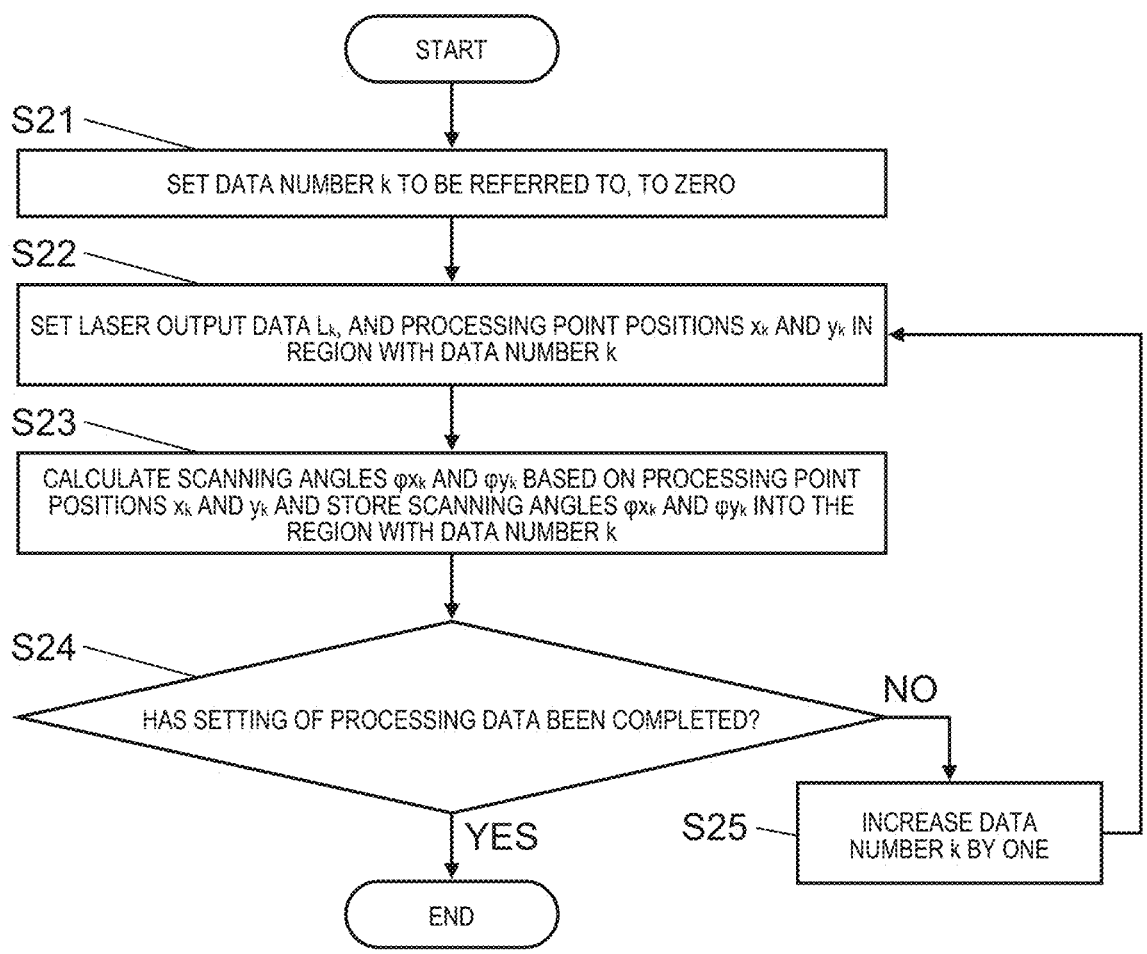
FIG. 18 is a flowchart illustrating a method of creating processing data.

Hereinafter, a method of creating processing data (corrected processing data) will be described with reference to FIG. 18. FIG. 18 is a flowchart illustrating a method of creating processing data.

As illustrated in FIG. 18, first, controller 6 of laser processing apparatus 1 sets data number k to be referred to, to zero (0) (step S21). Data number k is assigned to a region in memory 31 where the processing data is stored.

Next, controller 6 sets (stores) laser output data $L_k$, and processing point positions $x_k$ and $y_k$ in the region (memory position) with data number k in memory 31 (step S22). These values are set values that are set by a user of laser processing apparatus 1 by using an operator (for example, a keyboard, a mouse, or a touch panel) (not illustrated) in order to realize desired laser processing.

Next, controller 6 calculates scanning angles $\varphi x_k$ and $\varphi y_k$ of first mirror 13 on the basis of processing point positions $x_k$ and $y_k$ set in step S22, and stores scanning angles $\varphi x_k$ and $\varphi y_k$ into the region with data number k in memory 31 (step S23). In this case, in a case where a focal length of lens 14 is f, there is a relationship of $(x_k, y_k)=(2f\cdot\varphi x_k, 2f\cdot\varphi y_k)$ between the processing point positions and the scanning angles. Thus, the scanning angles are automatically determined on the basis of the processing point positions.

The user may preset a relational expression between the processing point position and the scanning angle, a correspondence number table, and the like. In this case, scanning angles $\varphi x_k$ and $\varphi y_k$ of first mirror 13 may be further determined by using the relational expression between the processing point positions and the scanning angles, and the correspondence number table.

Next, controller 6 determines whether or not the setting of the processing data has been completed for all data numbers k (step S24). In this case, in a case where the setting of the processing data has been completed for all data numbers k (YES in step S24), controller 6 finishes the flow.

On the other hand, in a case where the setting of the processing data is not completed for all data numbers k (NO in step S24), controller 6 increases data number k to be referred to by one (step S25). Thereafter, controller 6 returns the flow to step S22 and executes the subsequent steps.

As described above, processing data (corrected processing data) is set for all data numbers k.

Correction Angle Setting Method

Next, a description will be made of a method of setting a correction angle (second instruction value) at each processing point position for each piece of processing data set through the flow of FIG. 18 with reference to FIGS. 19 and 20.

First, a structure of processing position correction number table data will be described with reference to FIG. 19. FIG. 19 is a diagram illustrating processing position correction number table 34 schematically representing a structure of the processing position correction number table data.

Figure 19:
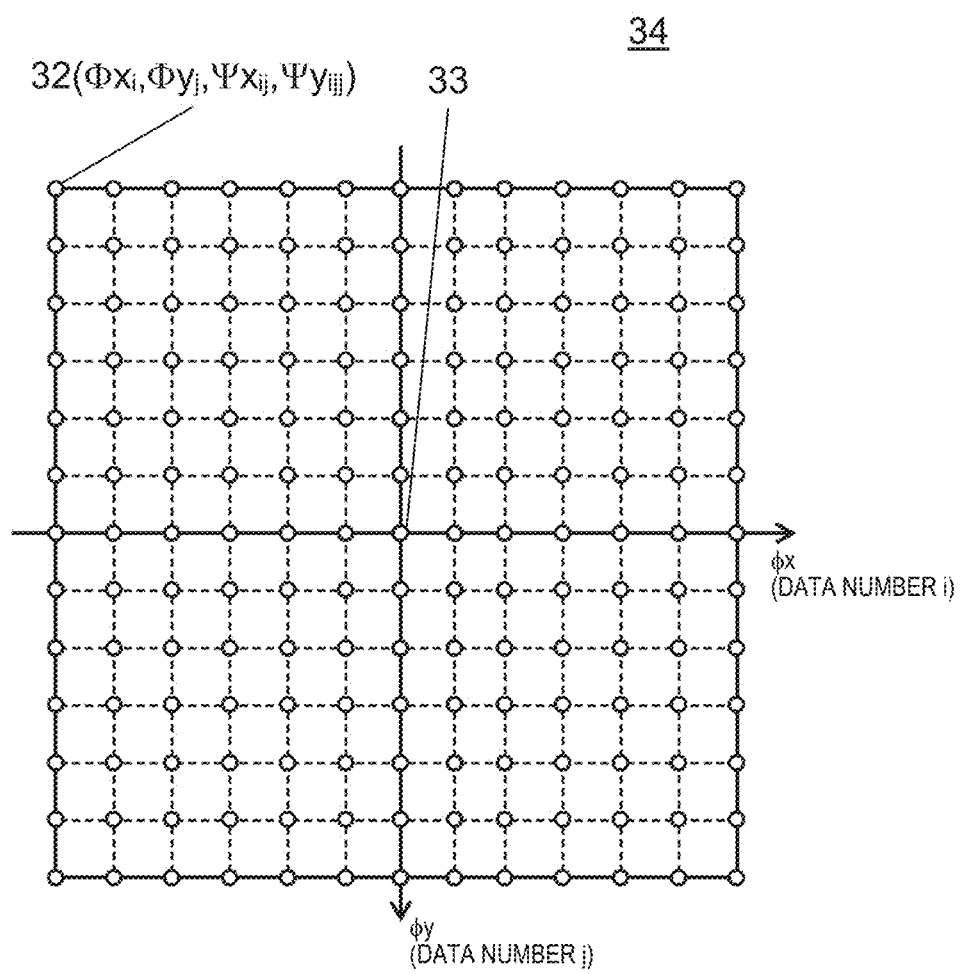
FIG. 19 is a diagram illustrating a correction number table schematically representing a structure of the correction number table data.

That is, FIG. 19 schematically illustrates the corrected processing data set for each lattice point on processing surface 19 as data points 32. As described above, each data point 32 that is the corrected processing data includes a position on processing surface 19 (that is, a processing point position), a scanning angle, and a correction angle. Correction data point 33 illustrated in FIG. 19 is a point corresponding to processing origin 26 on processing surface 19.

In the following description, a position of the data point 32 in the processing position correction number table 34 is indicated by the scanning angle ($\varphi x$, $\varphi y$) for convenience. A data number in a direction corresponding to scanning angle $\varphi x$ is indicated by i, and a data number in a direction corresponding to scanning angle $\varphi y$ is indicated by j.

In this case, each data point 32 stores ($\Phi x_i$, $\Phi y_j$, $\Psi x_{ij}$, $\Psi y_{ij}$) that is a set of the scanning angle ($\Phi x_i$, $\Phi y_j$) for the correction number table and the correction angle ($\Psi x_{ij}$, $\Psi y_{ij}$) for the correction number table. That is, the scanning angle ($\Phi x_i$, $\Phi y_j$) for the correction number table has an element of the scanning angle ($\varphi x$, $\varphi y$).

Next, a method of setting a correction angle (second instruction value) will be described with reference to FIG. 20. FIG. 20 is a flowchart illustrating a method of setting a correction angle.

Figure 20:
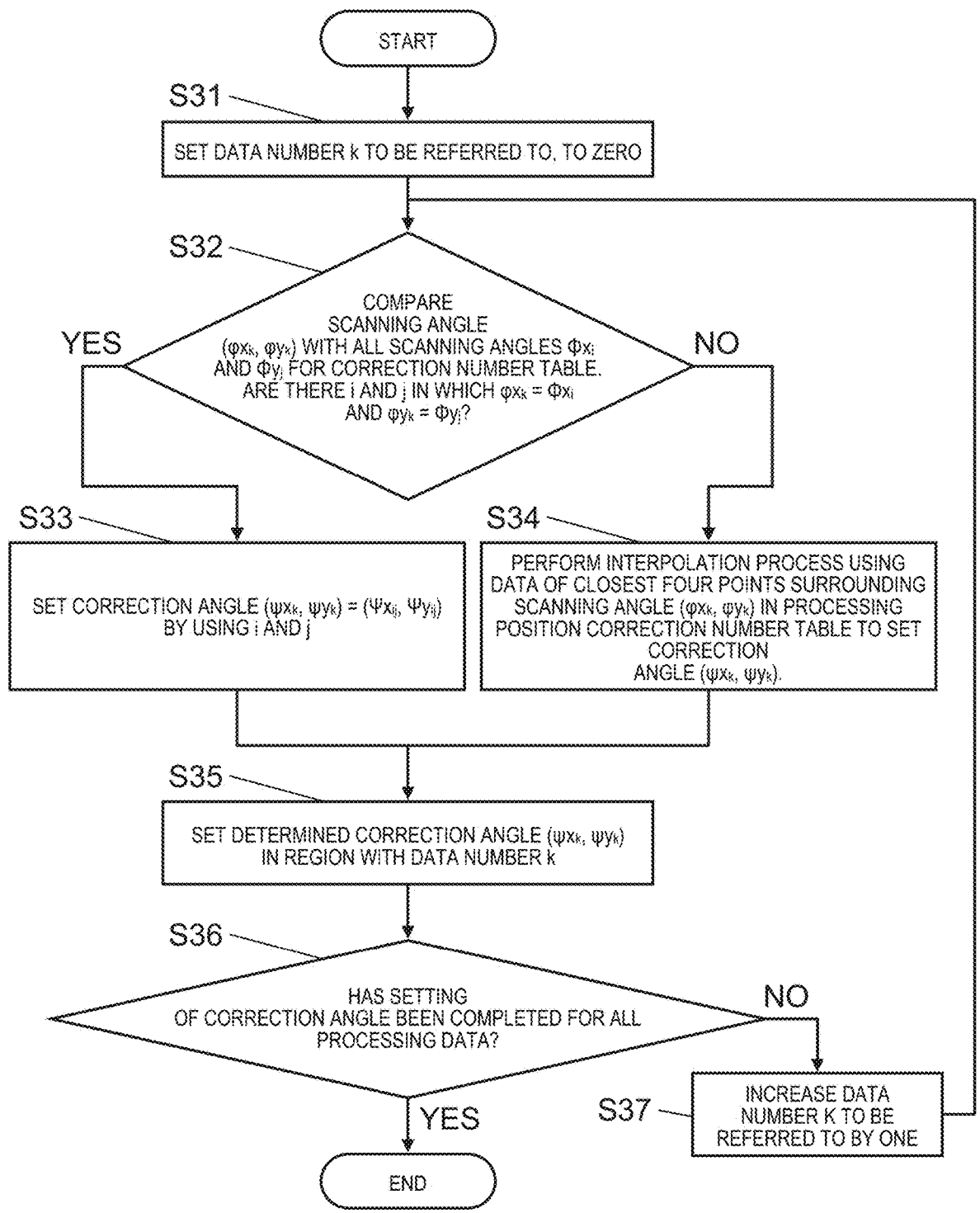
FIG. 20 is a flowchart illustrating a method of setting a correction angle.

As illustrated in FIG. 20, first, controller 6 sets data number k to be referred to, to zero (0) (step S31).

Next, controller 6 compares the scanning angle ($\varphi x_k$, $\varphi y_k$) stored in the region with data number k in memory 31 with all the scanning angles ($\Phi x_i$, $\Phi y_j$) for the correction number table in processing position correction number table 34. Controller 6 determines whether or not there are data numbers i and j in which $\varphi x_k=\Phi x_i$ and $\varphi y_k=\Phi y_j$ (step S32). Specifically, in step S32, controller 6 determines whether or not there is a data item including a scanning angle that is exactly the same as a scanning angle set by the user in processing position correction number table 34.

In this case, when there are data numbers i and j in which $\varphi x_k=\Phi x_i$ and $\varphi y_k=\Phi y_j$ (YES in step S32), controller 6 causes the flow to proceed to step S33 described below. On the other hand, when there are no data numbers i and j in which $\varphi x_k=\Phi x_i$ and $\varphi y_k=\Phi y_j$ (NO in step S32), controller 6 causes the flow to proceed to step S34.

In step S33, controller 6 uses the data numbers i and j in which $\varphi x_k=\Phi x_i$ and $\varphi y_k=\Phi y_j$ to set the correction angle ($\psi x_k$, $\psi y_k$)=($\Psi x_{ij}$, $\Psi y_{ij}$). That is, in this step S33, since there is a data item including a scanning angle that is exactly the same as the scanning angle set by the user, controller 6 sets the corresponding correction angle for the correction number table as the correction angle without any change.

in step S34, controller 6 performs an interpolation process using data of the closest four points surrounding the scanning angle ($\varphi x_k$, $\varphi y_k$) set by the user in the correction number table 34 to set the correction angle ($\psi x_k$, $\psi y_k$). Details of step S34 will be described later.

Next, controller 6 sets (stores) the correction angle ($\psi x_k$, $\psi y_k$) set in step S33 or step S34 in the region with data number k of the processing data in memory 31 (step S35).

Next, controller 6 determines whether or not the setting of the correction angle has been completed for all the processing data stored in memory 31 (step S36). In this case, when the setting of the correction angle has been completed for all of the processing data (YES in step S36), controller 6 finishes the flow.

On the other hand, when the setting of the correction angle setting has not been completed for all the processing data (NO in step S36), controller 6 increases data number k to be referred to by one (step S37). Thereafter, controller 6 returns the flow to step S32 and executes the subsequent steps.

As described above, in the processing data set through the flow illustrated in FIG. 18, the correction angle is set for all data numbers k. That is, the corrected processing data is generated.

Details of Interpolation Process

Next, the interpolation process in step S34 illustrated in FIG. 20 will be described in detail with reference to FIG. 21.

The interpolation process in step S34 is executed in a case where the scanning angle ($\varphi x_k$, $\varphi y_k$) set by the user does not match any of the scanning angles ($\Psi x_i$, $\Psi y_j$) for the correction number table in the data points 32.

Figure 21:
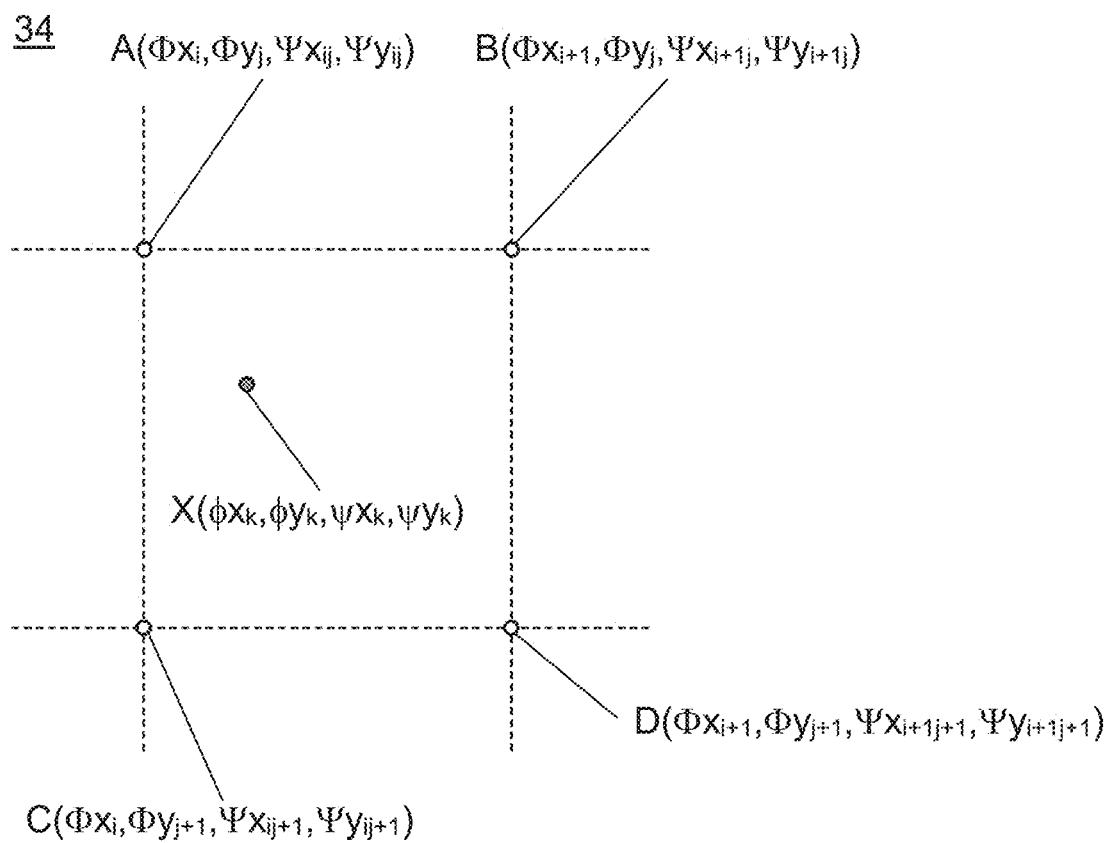
FIG. 21 is a diagram illustrating a relationship between scanning angle X and correction data points around scanning angle X in a case where scanning angle X set by the user does not match a scanning angle for the correction number table of any data point on the correction number table.

FIG. 21 is a diagram illustrating a relationship between scanning angle X ($\varphi x_k$, $\varphi y_k$) and correction data points therearound in a case where scanning angle X ($\varphi x_k$, $\varphi y_k$) set by the user as the processing data does not match the scanning angle ($\Phi x_i$, $\Phi y_j$) for the correction number table in any data point 32 in the processing position correction number table 34 illustrated in FIG. 19.

As illustrated in FIG. 21, a point corresponding to the scanning angle X ($\varphi x_k$, $\varphi y_k$, $\psi x_k$, $\psi y_k$) is located in a lattice formed by four points such as correction data point A ($\Phi x_i$, $\Phi y_{j+1}$, $\Psi x_{ij+1}$, $\Psi y_{ij+1}$), correction data point B $\Psi x_{i+1j}$, $\Psi y_{i+1j}$), correction data point C ($\Phi x_i$, $\Phi y_{j+1}$, $\Psi x_{ij+1}$, $\Psi y_{ij+1}$), and correction data point D ($\Phi x_{i+1}$, $\Phi y_{j+1}$, $\Psi x_{i+1j+1}$, $\Psi y_{i+1j+1}$). In this case, a relationship of $\Phi x_i \leq \varphi x_k \leq \Phi x_{i+1}$ (equal signs are not simultaneously established) and $\Phi y_j \leq \varphi y_k \leq \Phi y_{j+1}$ (equal signs are not simultaneously established) is established.

The correction angle ($\psi x_k$, $\psi y_k$) is obtained by using a value of scanning angle X ($\varphi x_k$, $\varphi y_k$) and values of correction data points A, B, C, and D on the basis of the following Equations (1) and (2).

$$\psi x_k = (E\Psi x_{ij} + F\Psi x_{i+1j} + G\Psi x_{ij+1} + H\Psi x_{i+1j+1})/J \quad (1)$$

$$\psi y_k = (E\Psi y_{ij} + F\Psi y_{i+1j} + G\Psi y_{ij+1} + H\Psi y_{i+1j+1})/J \quad (2)$$

E, F, G, H, and J in Equations (1) and (2) may be obtained according to the following Equations (3) to (7).

$$E = (\varphi x_k - \Phi x_i)(\varphi y_k - \Phi y_j) \quad (3)$$

$$F = (\Phi x_{i+1} - \varphi x_k)(\varphi y_k - \Phi y_j) \quad (4)$$

$$G = (\varphi x_k - \Phi x_i)(\Phi y_{j+1} - \varphi y_k) \quad (5)$$

$$H = (\Phi x_{i+1} - \varphi x_k)(\Phi y_{j+1} - \varphi y_k) \quad (6)$$

$$J = (\Phi x_{i+1} - \Phi x_i)(\Phi y_{j+1} - \Phi y_j) \quad (7)$$

Through the above-described interpolation process, the correction angle can be calculated on the basis of the scanning angle set by the user.

In the interpolation process, an example using the linear interpolation method has been described, but the present disclosure is not limited thereto. As the interpolation process, for example, a well-known two-dimensional interpolation method (spline interpolation, quadric surface approximation, or the like) may be used. As the interpolation process, a high-order approximate continuous curved surface of a correction angle with respect to a scanning angle may be calculated in advance from the correction angle ($\Psi x_{ij}$, $\Psi y_{ij}$) for the correction number table on processing position correction number table 34, and a correction angle corresponding to the scanning angle may be calculated.

Laser Processing Method

Next, the laser processing method by laser processing apparatus 1 will be described with reference to FIG. 22.

Figure 22:
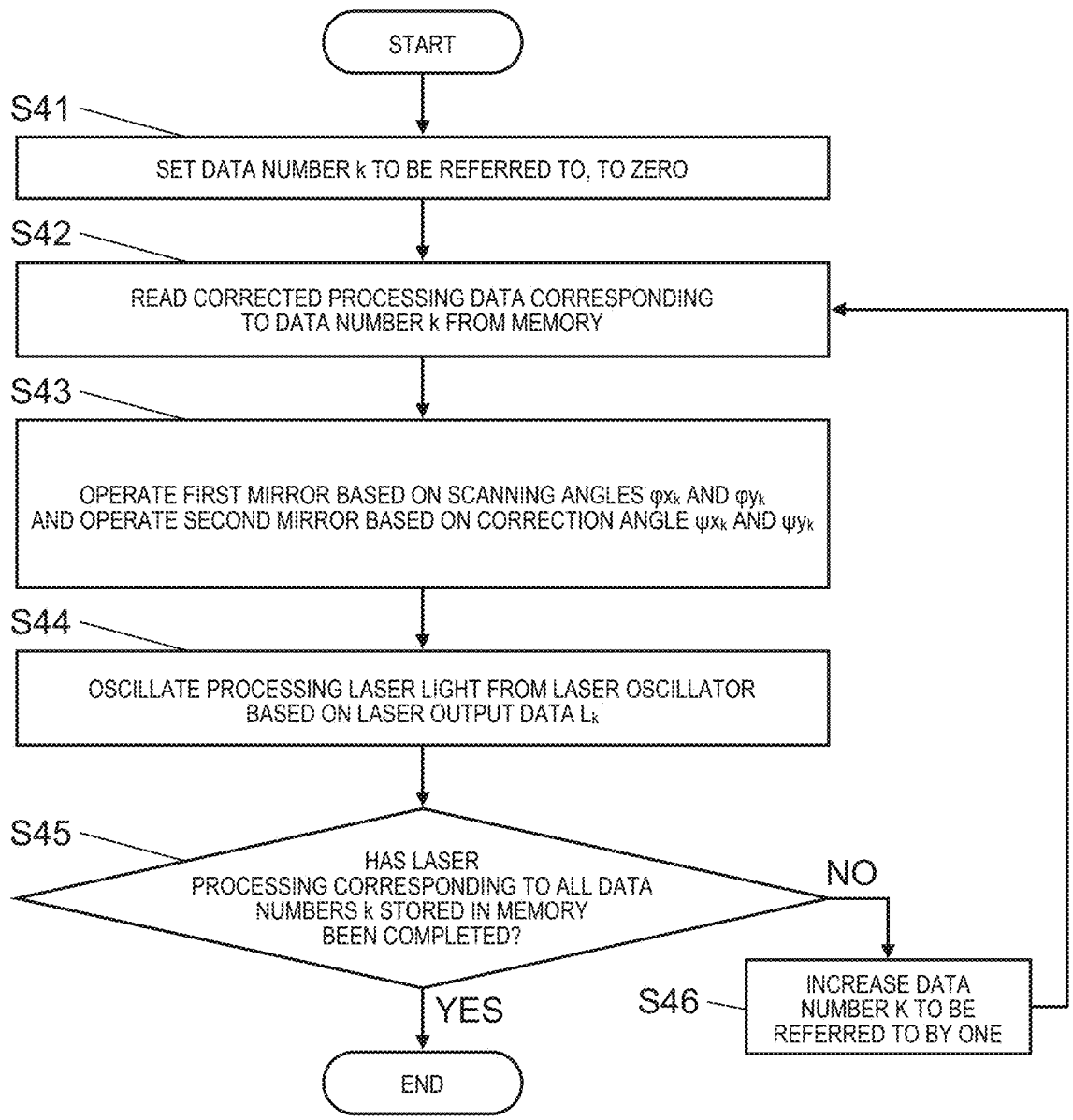
FIG. 22 is a flowchart illustrating a laser processing method.

FIG. 22 is a flowchart illustrating a laser processing method.

As illustrated in FIG. 22, first, controller 6 of laser processing apparatus 1 sets data number k to be referred to, to zero (0) (step S41).

Next, controller 6 reads corrected processing data (laser output data $L_k$, the scanning angle ($\varphi x_k$, $\varphi y_k$), and the correction angle ($\psi x_k$, $\psi y_k$)) corresponding to data number k from memory 31 (step S42).

Next, controller 6 operates first mirror 13 on the basis of the read scanning angle ($\varphi x_k$, $\varphi y_k$) and operates the second mirror 17 on the basis of the correction angle ($\psi x_k$, $\psi y_k$) (step S43).

Specifically, controller 6 notifies first driver 7 of the scanning angle ($\varphi x_k$, $\varphi y_k$). Consequently, first driver 7 operates first mirror 13 on the basis of the scanning angle ($\varphi x_k$, $\varphi y_k$). Controller 6 notifies second driver 8 of the correction angle ($\psi x_k$, $\psi y_k$). Consequently, second driver 8 operates second mirror 17 on the basis of the correction angle ($\psi x_k$, $\psi y_k$).

Next, controller 6 oscillates processing laser light 11 from laser oscillator 5 on the basis of read laser output data $L_k$ (step S44).

Specifically, controller 6 transmits laser output data $L_k$ as a laser output value to laser oscillator 5. Consequently, laser oscillator 5 oscillates processing laser light 11 on the basis of laser output data $L_k$.

Next, controller 6 determines whether or not laser processing corresponding to all data numbers k stored in memory 31 has been completed (step S45). In this case, when the laser processing corresponding to all data numbers k has been finished (YES in step S45), controller 6 finishes the flow.

On the other hand, in a case where the laser processing corresponding to all data numbers k has not been finished (NO in step S45), controller 6 increases data number k to be referred to by one (step S46).

Thereafter, controller 6 returns the flow to step S42 and executes the subsequent steps.

Through the above-described flow, laser processing is executed for all data numbers k.

Keyhole Depth Measurement Method

Next, with reference to FIG. 23, a method of measuring a depth of keyhole 22 (for example, refer to FIG. 1) at the time of executing the above-described laser processing method will be described.

Figure 23:
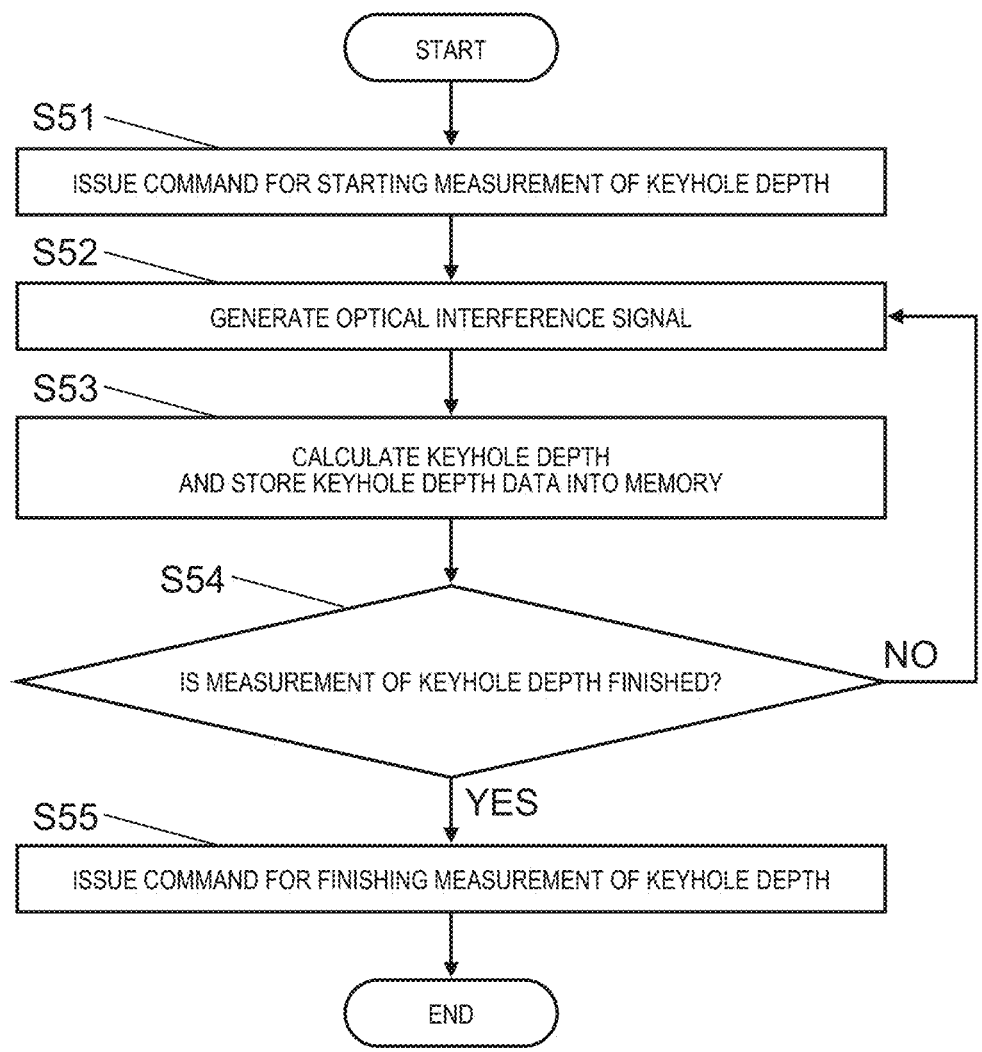
FIG. 23 is a flowchart illustrating a method of measuring a depth of a keyhole.

FIG. 23 is a flowchart illustrating a method of measuring a depth of keyhole 22.

First, controller 6 of laser processing apparatus 1 acquires position data regarding processing surface 19 of the unprocessed workpiece 18 before starting the laser processing method illustrated in FIG. 22. The position data is data indicating a height of processing surface 19 in an unprocessed state (in other words, the position of processing surface 19 in the z axis direction illustrated in FIG. 1 and the like).

Next, as illustrated in FIG. 23, controller 6 issues a command to measurement processor 4 to start measurement of a depth of keyhole 22 (step S51).

Next, when the laser processing method illustrated in FIG. 22 is started, measurement processor 4 emits measurement light 15 from optical interferometer 3. Measurement processor 4 generates an optical interference signal according to an optical path difference between measurement light 15 reflected from keyhole 22 and reference light (step S52).

Next, measurement processor 4 calculates a depth of keyhole 22 (that is, a penetration depth) by using the position data and the generated optical interference signal. Controller 6 stores the calculated data indicating the depth of keyhole 22 (hereinafter, referred to as "keyhole depth data") into memory 31 (step S53).

Next, controller 6 determines whether or not to finish the measurement of the depth of keyhole 22 (step S54). In this case, in a case where the measurement is not finished (NO in step S54), controller 6 returns the flow to step S52 and executes the subsequent steps.

On the other hand, in a case where the measurement is finished (YES in step S54), controller 6 issues a command to measurement processor 4 to finish the measurement of the depth of keyhole 22 after the laser processing method illustrated in FIG. 22 is finished (step S55).

It is not necessary for controller 6 to issue the command for starting the measurement of the depth of keyhole 22 in step S51 and the command for finishing the measurement of the depth of keyhole 22 in step S55. For example, there may be a configuration in which the user issues each of the above commands by using an operator and the like (not illustrated). Consequently, for example, a function of controlling the keyhole depth measurement and a function of controlling the laser processing can be separated from each other. Thus, the degree of freedom in designing laser processing apparatus 1 is improved.

Effects

As described above, according to the exemplary embodiment, laser processing apparatus 1 sets processing section Wx passing through processing light lattice point 30 on processing surface 19, sets data acquisition section Mx centered on processing light lattice point 30 in processing section Wx, and sets plurality of data acquisition positions 38 which are trajectories perpendicular to the processing direction in data acquisition section Mx. Laser processing apparatus 1 acquires measurement data indicating a shape of keyhole 22 at each of data acquisition positions 38 during processing of processing section Wx, projects the measurement data in the processing direction, and superimposes the measurement data to create projection data, and obtains the second instruction value (correction angle of second mirror 17) in the direction perpendicular to the processing direction at processing light lattice point 30 on the basis of the projection data.

According to this configuration, it is possible to correct a deviation between arrival positions of processing laser light 11 and measurement light 15 on processing surface 19 after being transmitted through lens 14, the deviation being caused by the chromatic aberration of magnification of lens 14. Consequently, a depth of keyhole 22 can be appropriately measured by optical interferometer 3. As a result, a depth of the keyhole can be measured more accurately.

Hereinafter, a correction result of the chromatic aberration of magnification of lens 14 in laser processing apparatus 1 having the above configuration will be described with reference to FIG. 24.

Figure 24:
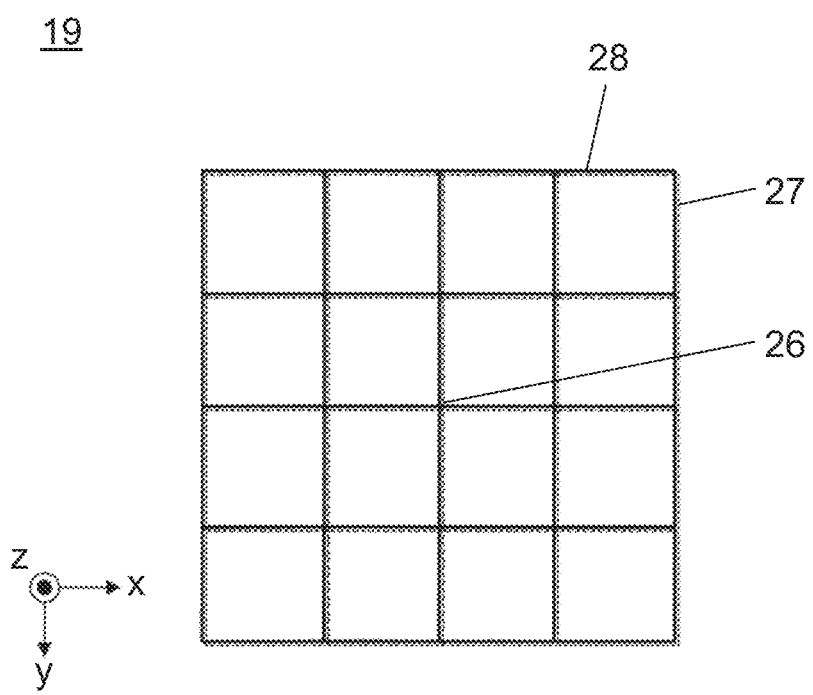
FIG. 24 is a diagram schematically illustrating trajectories of the processing laser light and the measurement light on the processing surface in a state in which the influence of the chromatic aberration of magnification is corrected through an operation of a second mirror.

FIG. 24 is a diagram illustrating examples of trajectories of processing laser light 11 and measurement light 15 on processing surface 19 in a state in which the influence of the chromatic aberration of magnification is corrected through an operation of second mirror 17.

As illustrated in FIG. 24, it can be seen that, through the above correction, processing light trajectory 28 that is a trajectory of processing laser light 11, measurement light trajectory 27 that is a trajectory of measurement light 15, and each lattice point match each other unlike in FIG. 4.

The present disclosure is not limited to the description of the above exemplary embodiment, and various modifications may occur within the scope without departing from the spirit of the present disclosure. Hereinafter, modification examples will be specifically described.

Modification Example 1

In the exemplary embodiment, the case where second mirror 17 that is a galvano mirror is used to change an optical axis direction of measurement light 15 has been described as an example, but the present disclosure is not limited thereto.

Figure 25:
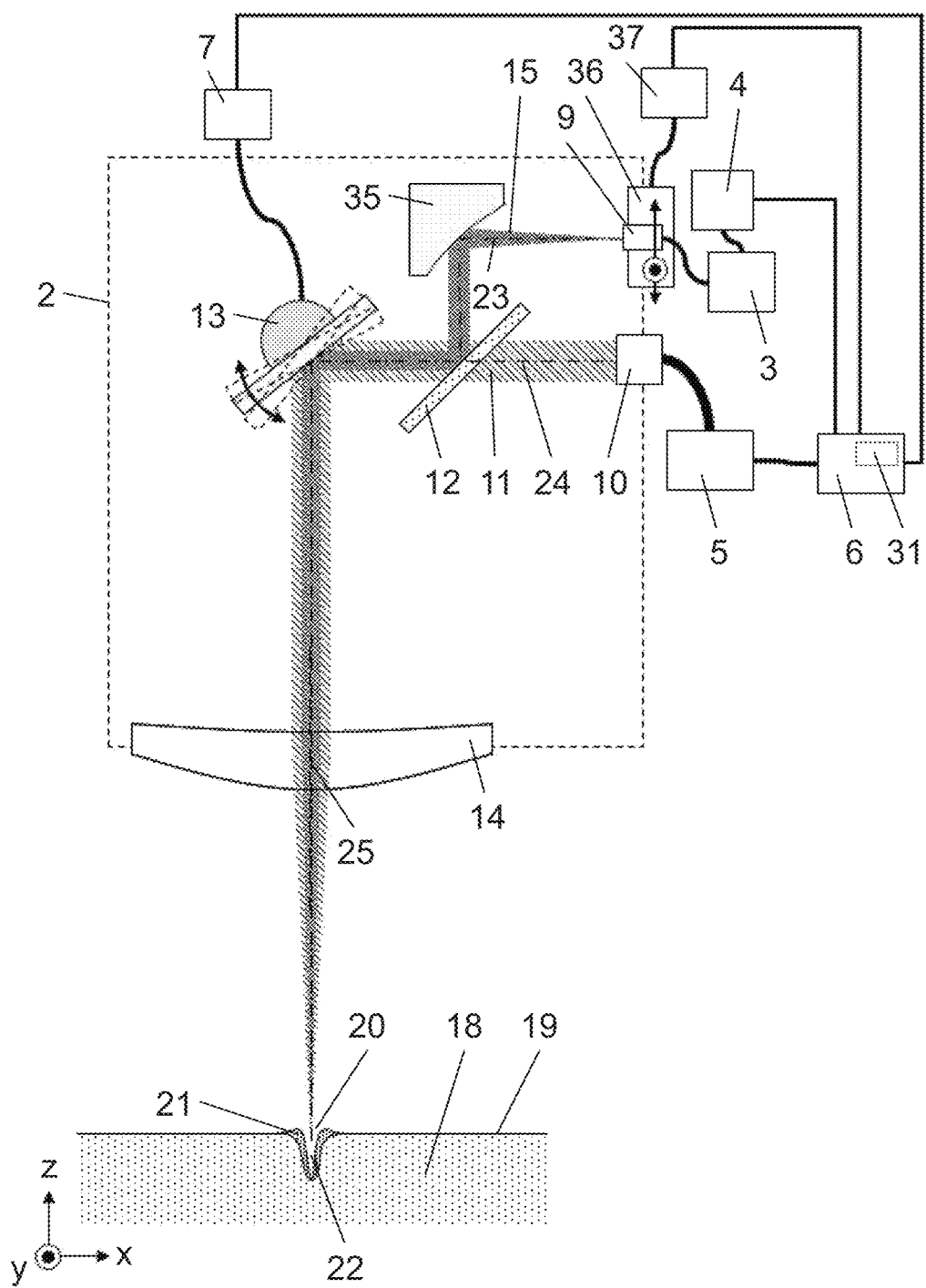
FIG. 25 is a diagram schematically illustrating a configuration of a laser processing apparatus according to Modification Example 1 of the present disclosure.
Figure 26:
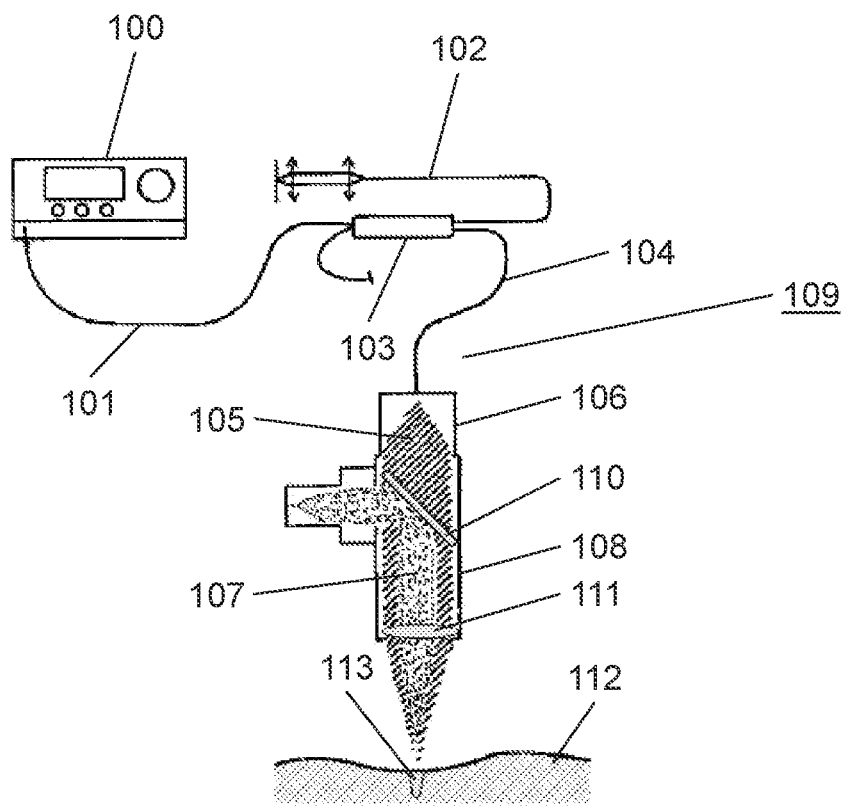
FIG. 26 is a diagram schematically illustrating a laser processing apparatus disclosed in Patent Document 1.

The second mirror used in laser processing apparatus 1 may be, for example, second mirror 35 illustrated in FIG. 25 that is provided between, for example, measurement light introduction port 9 and dichroic mirror 12, and can change the optical axis direction of measurement light 15 under the control of controller 6.

FIG. 25 is a diagram schematically illustrating laser processing apparatus 1 using second mirror 35.

Laser processing apparatus 1 illustrated in FIG. 25 has second mirror 35 instead of second mirror 17 illustrated in FIG. 1 and the like, and further has movement stage 36 and stage driver 37. Laser processing apparatus 1 illustrated in FIG. 25 does not have collimate lens 16 illustrated in FIG. 1 and the like.

Second mirror 35 is a parabolic mirror fixed between measurement light introduction port 9 and dichroic mirror 12. Second mirror 35 may be configured with a micro electro mechanical systems (MEMS) mirror or the like.

Movement stage 36 is provided at measurement light introduction port 9.

Stage driver 37 is electrically connected to controller 6, and operates movement stage 36 on the basis of an instruction from controller 6. Consequently, movement stage 36 is moved in the yz direction in FIG. 25 (refer to a vertical double-headed arrow in the figure). That is, a movement direction of movement stage 36 is a biaxial direction perpendicular to measurement optical axis 23.

An emission end of measurement light 15 at measurement light introduction port 9 is disposed to match a focal point of second mirror 35. Consequently, measurement light 15 becomes parallel light after being reflected by second mirror 35 and is directed toward dichroic mirror 12.

In this case, an angle of measurement optical axis 23 directed toward dichroic mirror 12 from second mirror 35 is changed due to movement of movement stage 36. Consequently, it is possible to achieve the same effect as when second mirror 17 that is a galvano mirror is used.

What is claimed is:

1. A laser processing apparatus comprising:
   a laser oscillator that oscillates processing laser light to be applied to a processing point on a processing surface of a workpiece;
   an optical interferometer that emits measurement light to be applied to the processing point and generates an optical interference signal based on interference caused by an optical path difference between the measurement light reflected at the processing point and reference light;
   a first mirror that changes traveling directions of the processing laser light and the measurement light;
   a second mirror that changes an incidence angle of the measurement light to the first mirror;
   a lens that collects the processing laser light and the measurement light at the processing point;
   a controller that controls the laser oscillator, the first mirror, and the second mirror on the basis of corrected processing data; and
   a measurement processor that measures a depth of a keyhole generated at the processing point irradiated with the processing laser light, on the basis of the optical interference signal, wherein
   the corrected processing data is data for eliminating a deviation in an arrival position of at least one of the processing laser light and the measurement light on the processing surface, the deviation being caused by chromatic aberration of the lens,
   the corrected processing data includes an output instruction value indicating an oscillation intensity of the processing laser light, a first instruction value indicating an operation amount of the first mirror, and a second instruction value indicating an operation amount of the second mirror, which are set for processing points, respectively, the controller controls the laser oscillator, the first mirror, and the second mirror on the basis of corrected processing data corresponding to the processing point among the processing points, and the controller
- sets a processing section passing through a target position on the processing surface,
- sets a measurement section centered on the target position in the processing section,
- sets a plurality of data acquisition positions that are trajectories perpendicular to a processing direction in the measurement section,
- acquires pieces of measurement data indicating shapes of keyholes at the respective data acquisition positions during processing of the processing section,
- projects the pieces of measurement data in the processing direction to be superimposed on each other to create projection data, and
- obtains the second instruction value in a direction perpendicular to the processing direction at the target position on the basis of the projection data.

2. The laser processing apparatus of claim 1, wherein the controller obtains the second instruction value in the direction perpendicular to the processing direction at the target position for each of an x axis and a y axis about which the first mirror and the second mirror rotationally operate.

3. The laser processing apparatus of claim 1, wherein the controller
- sets a lattice pattern on the processing surface, and
- sets a lattice point of the lattice pattern at the target position.

4. The laser processing apparatus of claim 1, wherein the controller generates and stores the corrected processing data.

5. A laser processing method performed by a laser processing apparatus including a first mirror that changes traveling directions of processing laser light and measurement light, a second mirror that changes an incidence angle of the measurement light to the first mirror, and a lens that collects the processing laser light and the measurement light at a processing point on a processing surface of a workpiece, controlling the first mirror and the second mirror to irradiate the workpiece with the processing laser light and the measurement light on the basis of corrected processing data, and measuring a depth of a keyhole generated at the processing point irradiated with the processing laser light, on the basis of interference caused by an optical path difference between the measurement light reflected at the processing point and reference light, wherein the corrected processing data is data for eliminating a deviation in an arrival position of at least one of the processing laser light and the measurement light on the processing surface, the deviation being caused by chromatic aberration of the lens, and the corrected processing data includes an output instruction value indicating an oscillation intensity of the processing laser light, a first instruction value indicating an operation amount of the first mirror, and a second instruction value indicating an operation amount of the second mirror, which are set in advance for processing points, the laser oscillator, the first mirror, and the second mirror are controlled on the basis of corrected processing data corresponding to the processing point among the processing points, and the laser processing method comprising:
causing the laser processing apparatus to execute:
- setting a processing section passing through a target position on the processing surface;
- setting a measurement section centered on the target position in the processing section;
- setting a plurality of data acquisition positions that are trajectories perpendicular to a processing direction in the measurement section;
- acquiring pieces of measurement data indicating shapes of keyholes at the respective data acquisition positions during processing of the processing section;
- projecting the pieces of measurement data in the processing direction to be superimposed on each other to create projection data; and
- obtaining the second instruction value in a direction perpendicular to the processing direction at the target position on the basis of the projection data.

* * * * *